(12) United States Patent
Grubka et al.

(10) Patent No.: US 11,761,210 B2
(45) Date of Patent: *Sep. 19, 2023

(54) SHINGLES WITH A THICK APPEARANCE

(71) Applicant: Owens Corning Intellectual Capital, LLC, Toledo, OH (US)

(72) Inventors: Lawrence J. Grubka, New Albany, OH (US); Douglas S. Penrod, Newark, OH (US); William E. Smith, Pataskala, OH (US); John A. Thies, Eden Prairie, MN (US); Jacob Paul Honsvick, Perrysburg, OH (US)

(73) Assignee: Owens Corning Intellectual Capital, LLC, Toledo, OH (US)

( * ) Notice: Subject to any disclaimer, the term of this patent is extended or adjusted under 35 U.S.C. 154(b) by 76 days.

This patent is subject to a terminal disclaimer.

(21) Appl. No.: 17/332,038

(22) Filed: May 27, 2021

(65) Prior Publication Data

US 2021/0285217 A1  Sep. 16, 2021

Related U.S. Application Data

(63) Continuation of application No. 16/209,386, filed on Dec. 4, 2018, now Pat. No. 11,021,876.

(Continued)

(51) Int. Cl.
*E04D 1/28* (2006.01)
*E04D 1/20* (2006.01)
(Continued)

(52) U.S. Cl.
CPC ............... *E04D 1/28* (2013.01); *B32B 11/10* (2013.01); *D06N 5/003* (2013.01); *E04D 1/12* (2013.01);
(Continued)

(58) Field of Classification Search
CPC .. B32B 3/02; B32B 3/08; B32B 3/266; B32B 5/02; B32B 7/14; B32B 11/10;
(Continued)

(56) References Cited

U.S. PATENT DOCUMENTS 1,153,418 A ‡ 9/1915 Bird .......................... E04D 1/28
52/518
1,412,828 A ‡ 4/1922 Beckman ................. D06B 3/10
118/102

(Continued)

FOREIGN PATENT DOCUMENTS

CA        1106590          8/1981
CA        1106590 A1 ‡    8/1981
(Continued)

OTHER PUBLICATIONS

Office Action from U.S. Appl. No. 16/209,386 dated Apr. 14, 2020.
(Continued)

*Primary Examiner* — James M Ference
(74) *Attorney, Agent, or Firm* — Calfee, Halter & Griswold LLP

(57) ABSTRACT

A shingle comprises an overlay, an underlay, and a height increasing material disposed between the overlay and the underlay. The height increasing material includes a first adhesive adhered to the overlay, height increasing granules adhered to the first adhesive, and a second adhesive adhered to the height increasing granules and the underlay. The height increasing material can extend along front ends of tab portions of the overlay, along front cutout edges that extend between tab portions of the overlay, or both.

21 Claims, 41 Drawing Sheets

Related U.S. Application Data

(60) Provisional application No. 62/655,910, filed on Apr. 11, 2018, provisional application No. 62/594,850, filed on Dec. 5, 2017.

(51) Int. Cl.

| | |
|---|---|
| *E04D 1/00* | (2006.01) |
| *B32B 11/10* | (2006.01) |
| *D06N 5/00* | (2006.01) |
| *E04D 1/12* | (2006.01) |
| *E04D 1/34* | (2006.01) |

(52) U.S. Cl.
CPC .............. *E04D 1/20* (2013.01); *E04D 1/29* (2019.08); *E04D 1/34* (2013.01); *B32B 2405/00* (2013.01); *E04D 2001/005* (2013.01); *E04D 2001/3423* (2013.01); *E04D 2001/3435* (2013.01); *E04D 2001/3455* (2013.01); *E04D 2001/3491* (2013.01)

(58) Field of Classification Search
CPC ............ B32B 2250/44; B32B 2250/02; B32B 2250/10; B32B 2262/02; B32B 2262/101; B32B 2405/00; B32B 2419/06; D06N 5/00; D06N 5/003; E04D 1/12; E04D 1/20; E04D 1/28; E04D 1/29; E04D 1/34; E04D 2001/005; E04D 2001/3423; E04D 2001/3435; E04D 2001/3455; E04D 2001/3491
See application file for complete search history.

(56) References Cited

U.S. PATENT DOCUMENTS

| | | | | |
|---|---|---|---|---|
| 1,547,498 A ‡ | 7/1925 | Jordan | ............... | E04D 3/34 52/748.1 |
| 1,913,475 A ‡ | 6/1933 | Conant | ............... | E04D 1/20 427/188 |
| 2,140,691 A ‡ | 12/1938 | Crump | ............... | E04D 5/10 52/96 |
| 2,184,328 A ‡ | 12/1939 | Wildman | ............... | E04D 1/2935 52/96 |
| 2,233,122 A ‡ | 2/1941 | Burns | ............... | D21H 19/00 427/188 |
| 2,400,746 A ‡ | 5/1946 | Fassiotto | ............... | B28B 1/54 427/188 |
| 3,247,631 A ‡ | 4/1966 | Lovness | ............... | E04D 1/29 52/518 |
| 3,252,257 A ‡ | 5/1966 | Price | ............... | E04D 1/26 52/518 |
| 3,613,328 A ‡ | 10/1971 | Morgan, Jr. et al. | ..... | E04D 1/26 52/555 |
| 3,624,975 A ‡ | 12/1971 | Morgan et al. | ........... | E04D 1/26 52/105 |
| 3,848,384 A ‡ | 11/1974 | Eaton | ............... | E04D 1/26 52/420 |
| 3,943,677 A ‡ | 3/1976 | Carothers | ............... | E04D 1/265 52/309.4 |
| 4,028,450 A ‡ | 6/1977 | Gould | ............... | E04D 3/351 264/45.5 |
| 4,191,722 A ‡ | 3/1980 | Gould | ............... | B29C 44/0407 264/45.5 |
| 4,212,692 A ‡ | 7/1980 | Rasen | ............... | D04H 3/16 156/167 |
| 4,233,100 A ‡ | 11/1980 | Cunningham | ......... | B23D 19/06 156/260 |
| 4,274,243 A ‡ | 6/1981 | Corbin | ............... | D06N 5/00 52/748.1 |
| 4,301,633 A ‡ | 11/1981 | Neumann | ............... | E04B 7/225 52/309.4 |
| 4,322,928 A ‡ | 4/1982 | Freiborg | ............... | E04D 1/26 52/521 |
| 4,333,279 A ‡ | 6/1982 | Corbin | ............... | E04D 1/26 52/105 |
| 4,352,837 A ‡ | 10/1982 | Kopenhaver | ............. | B44C 5/06 427/187 |
| 4,399,186 A ‡ | 8/1983 | Lauderback | ............... | D06N 5/00 442/374 |
| 4,439,955 A ‡ | 4/1984 | Freiborg | ............... | E04D 1/30 52/57 |
| 4,527,374 A ‡ | 7/1985 | Corbin | ............... | E04D 1/26 52/557 |
| 4,717,614 A ‡ | 1/1988 | Bondoc | ............... | E04D 1/29 428/143 |
| 4,795,661 A ‡ | 1/1989 | Bondoc | ............... | E04D 1/26 427/187 |
| 4,817,358 A ‡ | 4/1989 | Lincoln | ............... | E04D 5/12 52/557 |
| 4,835,929 A ‡ | 6/1989 | Bondoc | ............... | E04D 3/40 52/518 |
| 4,848,057 A ‡ | 7/1989 | MacDonald | ............... | E04D 1/26 52/518 |
| 4,869,942 A ‡ | 9/1989 | Jennus | ............... | E04D 5/10 428/77 |
| 4,992,315 A ‡ | 2/1991 | Zickell | ............... | B32B 27/36 428/40.3 |
| 5,232,530 A ‡ | 8/1993 | Malmquist | ............... | E04D 5/10 156/78 |
| D344,144 S ‡ | 2/1994 | Weaver | ............... | D25/139 |
| 5,305,569 A ‡ | 4/1994 | Malmquist | ............... | E04D 1/26 52/309.8 |
| 5,369,929 A ‡ | 12/1994 | Weaver | ............... | E04D 1/26 52/314 |
| 5,426,902 A ‡ | 6/1995 | Stahl | ............... | E04D 1/20 52/314 |
| 5,465,547 A ‡ | 11/1995 | Jakel | ............... | E04D 1/04 106/608 |
| 5,611,186 A ‡ | 3/1997 | Weaver | ............... | E04D 1/26 52/314 |
| 5,676,597 A ‡ | 10/1997 | Bettoli | ............... | E04D 1/30 454/365 |
| 5,951,796 A ‡ | 9/1999 | Murray | ............... | E04F 13/0885 156/78 |
| 6,010,589 A ‡ | 1/2000 | Stahl | ............... | B32B 38/1808 156/260 |
| 6,014,847 A ‡ | 1/2000 | Phillips | ............... | E04D 1/26 52/311.1 |
| 6,038,826 A ‡ | 3/2000 | Stahl | ............... | B32B 3/30 52/554 |
| 6,044,608 A ‡ | 4/2000 | Stahl | ............... | E04D 1/26 52/518 |
| 6,083,592 A ‡ | 7/2000 | Chich | ............... | E04D 1/29 428/40.3 |
| 6,105,329 A ‡ | 8/2000 | Bondoc | ............... | E04D 1/26 428/143 |
| 6,190,754 B1 ‡ | 2/2001 | Bondoc | ............... | E04D 1/26 428/143 |
| 6,220,329 B1 ‡ | 4/2001 | King | ............... | B32B 3/02 156/512 |
| 6,289,648 B1 ‡ | 9/2001 | Freshwater | ............... | D06N 5/00 52/314 |
| 6,305,138 B1 ‡ | 10/2001 | Stahl | ............... | E04D 1/20 52/314 |
| 6,355,132 B1 ‡ | 3/2002 | Becker | ............... | B32B 38/1808 156/260 |
| 6,361,851 B1 ‡ | 3/2002 | Sieling | ............... | B32B 3/02 428/141 |
| 6,457,290 B1 ‡ | 10/2002 | Elliott | ............... | E04D 1/26 427/188 |
| 6,470,642 B1 ‡ | 10/2002 | Eads | ............... | E04D 15/02 52/518 |
| 6,471,812 B1 ‡ | 10/2002 | Thompson | ............... | E04D 1/28 156/242 |
| D466,629 S ‡ | 12/2002 | Phillips | ............... | D25/139 |
| 6,510,664 B2 ‡ | 1/2003 | Kupczyk | ............... | E04D 1/26 52/528 |
| 6,521,076 B1 ‡ | 2/2003 | Elliott | ............... | E04D 1/26 156/259 |

(56) References Cited

U.S. PATENT DOCUMENTS

| | | | | |
|---|---|---|---|---|
| 6,544,374 B2 ‡ | 4/2003 | King | ............... | B32B 7/12 156/260 |
| 6,692,608 B2 ‡ | 2/2004 | Phillips | ............... | B05D 5/061 156/260 |
| 6,708,456 B2 ‡ | 3/2004 | Kiik | ............... | C03C 25/48 52/98 |
| 6,933,037 B2 ‡ | 8/2005 | McCumber | ............... | B32B 3/00 428/143 |
| 7,048,990 B2 ‡ | 5/2006 | Koschitzky | ............... | E04D 1/26 428/144 |
| 7,073,295 B2 ‡ | 7/2006 | Pressutti | ............... | E04D 1/30 52/57 |
| 7,121,055 B2 ‡ | 10/2006 | Penner | ............... | E04D 1/30 52/518 |
| 7,281,358 B2 ‡ | 10/2007 | Floyd | ............... | E04D 1/26 52/518 |
| 7,368,155 B2 ‡ | 5/2008 | Larson | ............... | E04D 5/10 428/141 |
| 7,475,516 B2 ‡ | 1/2009 | Jolitz | ............... | E04D 1/12 52/518 |
| 7,578,108 B2 ‡ | 8/2009 | Swanson | ............... | E04D 1/26 156/71 |
| 7,743,573 B1 ‡ | 6/2010 | Doberstein | ............... | E04D 1/28 52/169.14 |
| 7,776,391 B2 ‡ | 8/2010 | Teng | ............... | B05D 1/40 427/188 |
| 7,781,046 B2 ‡ | 8/2010 | Kalkanoglu | ............... | E04D 1/20 428/143 |
| 7,867,562 B2 ‡ | 1/2011 | Wisniewski | ............... | B05D 3/042 427/256 |
| 7,877,949 B1 ‡ | 2/2011 | Elliott | ............... | E04D 1/26 52/314 |
| 7,921,606 B2 ‡ | 4/2011 | Quaranta | ............... | E04D 1/30 52/57 |
| 7,971,406 B2 ‡ | 7/2011 | Kalkanoglu | ............... | E04D 1/26 52/559 |
| 8,266,861 B2 ‡ | 9/2012 | Koch | ............... | E04D 1/30 52/520 |
| 8,281,520 B2 ‡ | 10/2012 | Quaranta | ............... | E04D 1/30 52/57 |
| 8,297,020 B1 ‡ | 10/2012 | Swanson | ............... | E04D 1/26 156/297 |
| 8,430,983 B2 ‡ | 4/2013 | Vermilion | ............... | E04D 1/26 156/279 |
| 8,557,366 B2 ‡ | 10/2013 | Harrington, Jr. | ............... | E04D 1/26 428/141 |
| 8,613,165 B2 ‡ | 12/2013 | Bleil | ............... | E04D 1/20 52/43 |
| 8,623,164 B2 ‡ | 1/2014 | Belt | ............... | B32B 3/30 156/260 |
| 8,793,955 B2 ‡ | 8/2014 | Ray | ............... | E04D 1/26 52/528 |
| 9,097,020 B2 ‡ | 8/2015 | Grubka | ............... | E04D 1/30 |
| 9,140,012 B1 ‡ | 9/2015 | Leitch | ............... | E04D 1/26 |
| 9,151,055 B2 ‡ | 10/2015 | Grubka | ............... | E04D 1/30 |
| 9,242,432 B1 ‡ | 1/2016 | Harrington, Jr. | ............... | E04D 1/28 |
| D750,810 S ‡ | 3/2016 | Buzza | ............... | D25/139 |
| 9,279,255 B2 ‡ | 3/2016 | Bryson | ............... | E04D 1/26 |
| RE46,177 E ‡ | 10/2016 | Vermilion | ............... | B32B 37/144 |
| 9,464,439 B2 ‡ | 10/2016 | Buzza | ............... | E04D 1/12 |
| 9,650,787 B2 ‡ | 5/2017 | Montojo | ............... | E04D 1/30 |
| 9,725,907 B2 ‡ | 8/2017 | Harrington | ............... | E04D 1/28 |
| 9,758,970 B2 ‡ | 9/2017 | Grubka | ............... | E04D 1/20 |
| 2002/0189189 A1 ‡ | 12/2002 | Kupczyk | ............... | E04D 1/26 52/557 |
| 2003/0040241 A1 ‡ | 2/2003 | Kiik | ............... | A47G 27/0468 442/242 |
| 2003/0152747 A1 ‡ | 8/2003 | Fensel | ............... | B32B 11/10 428/143 |
| 2003/0163964 A1 ‡ | 9/2003 | Elliott | ............... | E04D 1/26 52/314 |
| 2003/0196389 A1 ‡ | 10/2003 | Naipawer | ............... | E04D 1/30 52/57 |
| 2003/0196919 A1 ‡ | 10/2003 | Herve | ............... | B65D 85/62 206/323 |
| 2004/0055240 A1 ‡ | 3/2004 | Kiik | ............... | A47G 27/0468 52/545 |
| 2004/0079042 A1 ‡ | 4/2004 | Elliott | ............... | E04D 1/26 52/557 |
| 2004/0103611 A1 ‡ | 6/2004 | King | ............... | E04D 1/26 52/554 |
| 2004/0107664 A1 ‡ | 6/2004 | Rodrigues | ............... | E04D 1/20 52/557 |
| 2004/0123537 A1 ‡ | 7/2004 | Elliott | ............... | E04D 1/26 52/314 |
| 2004/0123543 A1 ‡ | 7/2004 | Elliott | ............... | E04D 1/26 52/518 |
| 2004/0123545 A1 ‡ | 7/2004 | Phillips | ............... | E04D 1/26 52/535 |
| 2004/0144060 A1 ‡ | 7/2004 | Becker | ............... | B32B 38/1808 52/745.15 |
| 2004/0172908 A1 ‡ | 9/2004 | Swann | ............... | E04D 5/12 52/518 |
| 2004/0206012 A1 ‡ | 10/2004 | Pressutti | ............... | E04D 1/30 52/57 |
| 2004/0258883 A1 ‡ | 12/2004 | Weaver | ............... | B32B 11/04 428/143 |
| 2005/0193673 A1 ‡ | 9/2005 | Rodrigues | ............... | B32B 3/06 52/518 |
| 2005/0202216 A1 ‡ | 9/2005 | Rodrigues | ............... | E04D 1/26 428/194 |
| 2005/0252137 A1 ‡ | 11/2005 | Bartek | ............... | B32B 11/04 52/518 |
| 2005/0262790 A1 ‡ | 12/2005 | Turek | ............... | E04D 1/30 52/518 |
| 2006/0068188 A1 ‡ | 3/2006 | Morse | ............... | E04F 13/0866 428/304.4 |
| 2006/0179767 A1 ‡ | 8/2006 | Miller | ............... | E04D 1/26 52/555 |
| 2006/0201094 A1 ‡ | 9/2006 | Lassiter | ............... | E04D 1/34 52/518 |
| 2006/0265990 A1 ‡ | 11/2006 | Kalkanoglu | ............... | B32B 37/1284 52/518 |
| 2007/0042158 A1 ‡ | 2/2007 | Belt | ............... | B32B 3/10 428/143 |
| 2007/0044410 A1 ‡ | 3/2007 | Kalkanoglu | ............... | E04D 1/26 52/526 |
| 2007/0068108 A1 ‡ | 3/2007 | Kiik | ............... | E04D 1/26 52/518 |
| 2007/0013713 A1 ‡ | 6/2007 | Nagarajan | ............... | B32B 5/26 52/518 |
| 2007/0137131 A1 | 6/2007 | Nagarajan et al. | | |
| 2007/0144077 A1 ‡ | 6/2007 | Quaranta | ............... | E04D 1/30 52/43 |
| 2007/0213418 A1 ‡ | 9/2007 | Vermilion | ............... | C08L 95/00 521/83 |
| 2008/0005995 A1 ‡ | 1/2008 | Elliott | ............... | E04D 1/26 52/557 |
| 2008/0086970 A1 ‡ | 4/2008 | Teng | ............... | E04D 1/26 52/518 |
| 2008/0134612 A1 ‡ | 6/2008 | Koschitzky | ............... | E04D 1/26 52/553 |
| 2008/0236079 A1 ‡ | 10/2008 | MacKinnon | ............... | E04D 1/20 52/311.1 |
| 2009/0158685 A1 ‡ | 6/2009 | Swanson | ............... | E04D 1/26 52/543 |
| 2009/0229210 A1 * | 9/2009 | Binkley | ............... | B29C 66/81429 52/518 |
| 2010/0192499 A1 ‡ | 8/2010 | Bryson | ............... | E04D 1/205 52/540 |
| 2010/0196647 A1 ‡ | 8/2010 | Bryson | ............... | E04D 1/20 428/40.3 |
| 2010/0212240 A1 ‡ | 8/2010 | Grubka | ............... | E04D 1/29 52/309.1 |
| 2011/0005158 A1 ‡ | 1/2011 | Kailey | ............... | E04D 1/20 52/518 |

(56) References Cited

U.S. PATENT DOCUMENTS

| | | | | |
|---|---|---|---|---|
| 2011/0056148 A1‡ | 3/2011 | Jenkins | E04B 7/22 | 52/90.1 |
| 2011/0061326 A1‡ | 3/2011 | Jenkins | E04D 1/26 | 52/518 |
| 2011/0126485 A1‡ | 6/2011 | Bleil | E04D 1/20 | 52/528 |
| 2011/0151170 A1‡ | 6/2011 | Grubka | E04D 1/20 | 428/43 |
| 2011/0185668 A1‡ | 8/2011 | Kiik | E04D 1/28 | 52/518 |
| 2011/0189433 A1‡ | 8/2011 | Kiik | E04D 3/35 | 428/144 |
| 2011/0197534 A1‡ | 8/2011 | Belt | B32B 5/022 | 52/520 |
| 2011/0214378 A1‡ | 9/2011 | Grubka | E04D 1/30 | 52/553 |
| 2011/0247288 A1‡ | 10/2011 | Kalkanoglu | E04D 1/26 | 52/525 |
| 2011/0283646 A1‡ | 11/2011 | Vermilion | E04D 1/26 | 52/539 |
| 2012/0005977 A1‡ | 1/2012 | Kalkanoglu | E04D 1/26 | 52/518 |
| 2012/0258282 A1‡ | 10/2012 | Hammond | C04B 26/26 | 428/143 |
| 2012/0260597 A1‡ | 10/2012 | Jenkins | E04D 1/26 | 52/518 |
| 2013/0025224 A1‡ | 1/2013 | Vermilion | E04D 1/26 | 52/309.2 |
| 2013/0025226 A1‡ | 1/2013 | Jenkins | E04D 1/26 | 52/557 |
| 2013/0025771 A1‡ | 1/2013 | Vermilion | B32B 41/00 | 156/182 |
| 2013/0177728 A1‡ | 7/2013 | Grubka | E04D 1/20 | 428/43 |
| 2013/0239506 A1‡ | 9/2013 | Ray | E04D 1/26 | 52/553 |
| 2013/0318911 A1‡ | 12/2013 | Sealock | E04C 2/00 | 52/747.1 |
| 2014/0245690 A1‡ | 9/2014 | Stahl | E04D 1/26 | 52/547 |
| 2014/0272244 A1‡ | 9/2014 | Harrington, Jr. | E04D 1/26 | 428/57 |
| 2015/0240495 A1‡ | 8/2015 | Vermilion | E04D 1/20 | 428/142 |
| 2015/0259920 A1‡ | 9/2015 | Hassan | E04D 1/28 | 428/148 |
| 2015/0315789 A1‡ | 11/2015 | Buzza | E04D 1/20 | 52/526 |
| 2016/0017608 A1‡ | 1/2016 | Grubka | B32B 37/24 | 156/253 |
| 2016/0177569 A1‡ | 6/2016 | Leitch | E04D 1/26 | 52/559 |
| 2016/0186438 A1‡ | 6/2016 | Montojo | E04D 1/30 | 52/518 |
| 2017/0175393 A1‡ | 6/2017 | Leitch | E04D 1/26 | |
| 2017/0321423 A1‡ | 11/2017 | Aschenbeck | E04D 1/36 | |
| 2019/0017273 A1‡ | 1/2019 | Vermilion | E04D 1/20 | |
| 2019/0177978 A1‡ | 6/2019 | Grubka | E04D 1/12 | |

FOREIGN PATENT DOCUMENTS

| | | | |
|---|---|---|---|
| CA | 1198872 | 1/1986 | |
| CA | 1198872 A1 ‡ | 1/1986 | |
| CA | 2144362 | 10/1995 | |
| CA | 2144362 A1 ‡ | 10/1995 | |
| DE | 19529900 | 2/1996 | |
| DE | 19529900 A1 ‡ | 2/1996 | E04D 1/2918 |
| EP | 1412591 | 1/2005 | |
| EP | 1412591 B1 ‡ | 1/2005 | B32B 27/304 |
| WO | 2005010294 | 2/2005 | |
| WO | WO-2005010294 A2 ‡ | 2/2005 | E04D 5/10 |

OTHER PUBLICATIONS

Office Action from U.S. Appl. No. 16/209,386 dated Jul. 20, 2020.
Office Action from U.S. Appl. No. 16/209,386 dated Oct. 15, 2020.
Notice of Allowance from U.S. Appl. No. 16/209,386 dated Feb. 4, 2021.

\* cited by examiner
‡ imported from a related application

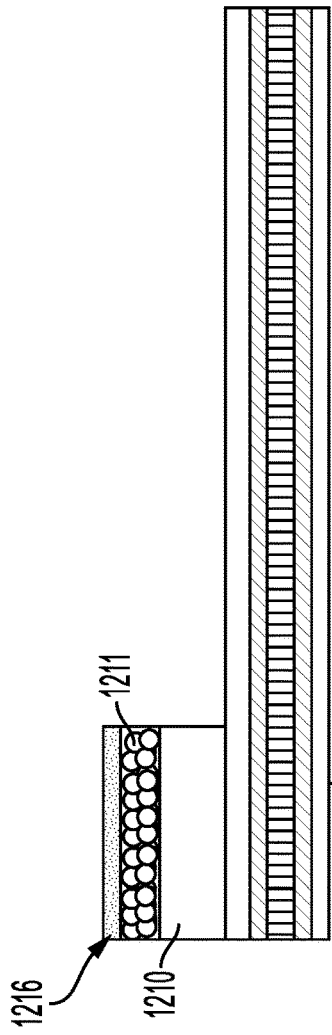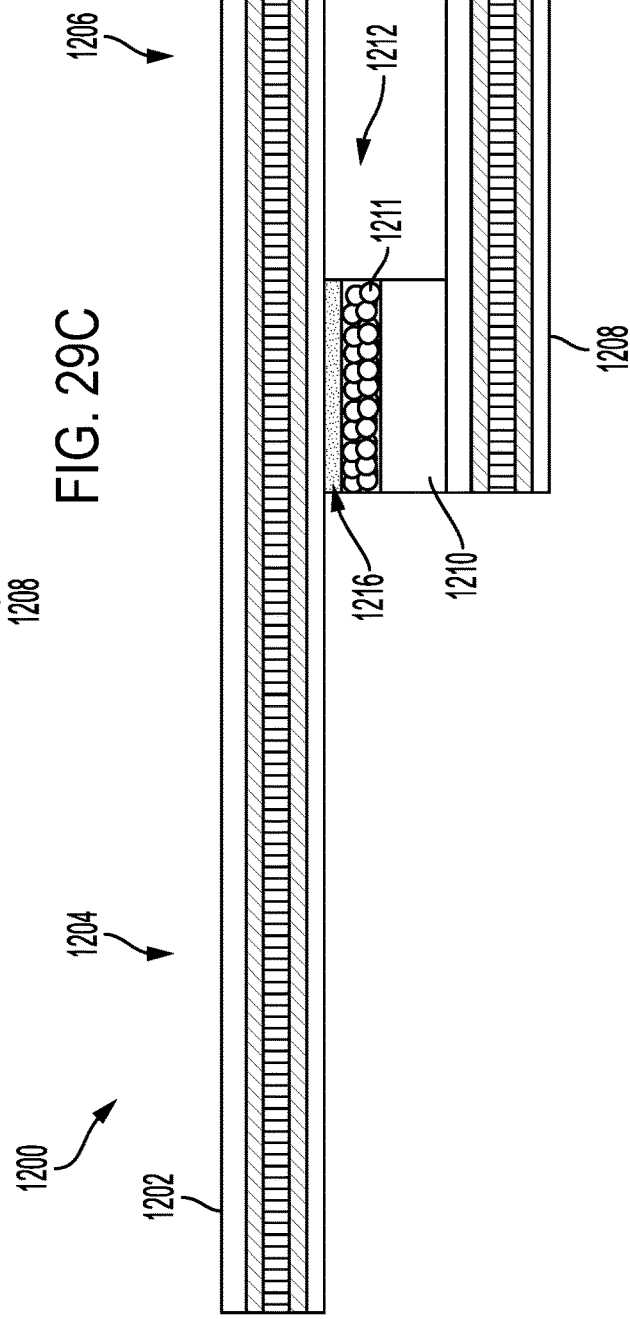

SHINGLES WITH A THICK APPEARANCE

RELATED APPLICATIONS

This patent application is a continuation of U.S. patent application Ser. No. 16/209,386, filed on Dec. 4, 2018, which claims the benefit of U.S. Provisional Patent Application Ser. No. 62/594,850, filed on Dec. 5, 2017, and of U.S. Provisional Patent Application Ser. No. 62/655,910, filed on Apr. 11, 2018, all of which are incorporated herein by reference in their entireties.

TECHNICAL FIELD

The present invention relates generally to roof shingles for protecting a roof of a structure, and more particularly, shingles having a thick appearance.

BACKGROUND OF THE INVENTION

Many structures have pitched, shingled roofs, which prevent water, e.g., rain water, from entering the structures by causing water to pass over the shingles and shed off the roofs. A pitched, shingled roof has a pitched substrate, such as a plurality of plywood sheets, with a plurality of shingles attached thereto.

Each shingle has an upper portion (i.e., a headlap portion) and a lower portion (i.e., an exposure portion) wherein the exposure portion is exposed to the environment. The shingles are typically attached to the substrate in rows known as courses wherein the exposure portion of an upper course of shingles overlaps the headlap portion of an adjacent lower course of shingles. For example, a first course of shingles may be attached to the substrate nearest the lowest point of the roof, i.e., the eave portion of the roof. A second course of shingles may then be attached to the substrate slightly higher on the roof than the first course. The shingles are placed so that the exposure portion of the second course of shingles overlaps the headlap portion of the first course of shingles. This overlapping continues with successive rows of shingles to the highest point on the area of the roof, i.e., the hip or the ridge.

Hip and ridge shingles are applied along a hip or ridge of a roof (i.e., transverse to the courses of shingles). These hip and ridge shingles span a gap or intersection between courses of shingles of roof planes that meet at a hip or ridge. These hip and ridge shingles are typically applied along the hip or ridge in a similar fashion, with the exposure portion of one hip and ridge shingle covering the headlap portion of an adjacent shingle on the hip or ridge. Thus, only the exposure portion of the shingles are exposed to the environment. This overlapping of the shingles causes water to pass from shingles on higher courses to shingles on the next lowest course of shingles without contacting the substrate. Accordingly, water passes from shingle to shingle and off the roof without contacting the substrate or entering the structure.

Attaching the shingles to the roof is typically achieved using nails or other fastening devices that pass through the shingles and into or through the substrate. The fastening devices are typically placed through the headlap portion of the shingles so that they are overlapped by shingles in an adjacent higher course as described above. This placement of the fasteners prevents water from entering the structure through holes caused by the fasteners.

Some roofs have a membrane (i.e., an underlayment) located between the substrate and the shingles. The membrane may, as an example, be conventional tar paper or other underlayment material that is nailed to the substrate. Strips of the membrane are typically attached to the roof in an overlapping fashion wherein an upper strip overlaps its adjacent lower strip. Accordingly, the membrane serves to shield the substrate from water should a shingle become damaged. For example, if a shingle becomes cracked or otherwise leaks, water will contact the membrane rather than the substrate. Water will then pass along the membrane without contacting the substrate or entering the structure.

SUMMARY

The present application discloses several embodiments of shingles having thickened portions. In one exemplary embodiment, a shingle comprises an overlay, an underlay, and a height increasing material disposed between the overlay and the underlay. The height increasing material can include a first adhesive adhered to the overlay, height increasing granules adhered to the first adhesive, and a second adhesive adhered to the height increasing granules and the underlay. The height increasing material can extend along front ends of tab portions of the overlay, along front cutout edges that extend between tab portions of the overlay, or both.

BRIEF DESCRIPTION OF THE DRAWINGS

These and other features and advantages of the present invention will become better understood with regard to the following description and accompanying drawings in which:

FIGS. 6A-11A illustrate the steps to install exemplary hip and ridge shingles on the hip or ridge of a roof;

FIGS. 29A-D show side views of exemplary laminated shingle having a deposited height increasing material in varying stages of construction;

DETAILED DESCRIPTION

Figure 1:
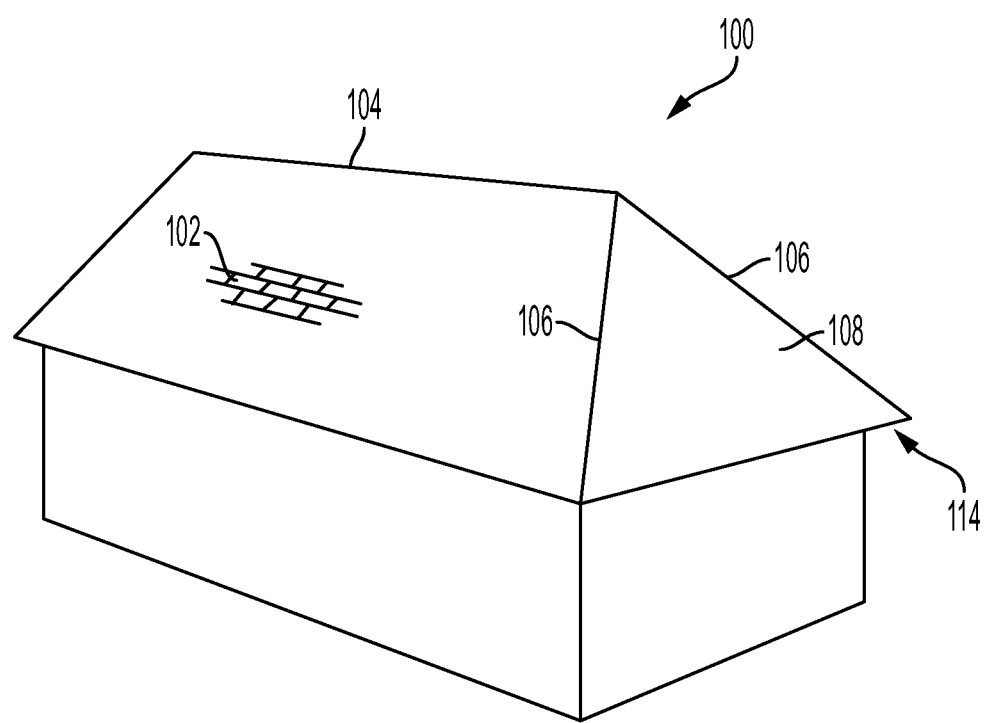
FIG. 1 is a perspective diagram of a roof of a residential home.
Figure 2:
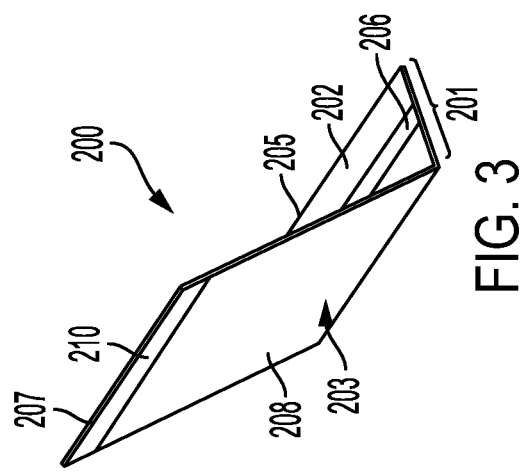
FIGS. 2-5 are perspective views of an exemplary hip and ridge shingle being folded from an unfolded to folded condition.
Figure 3:
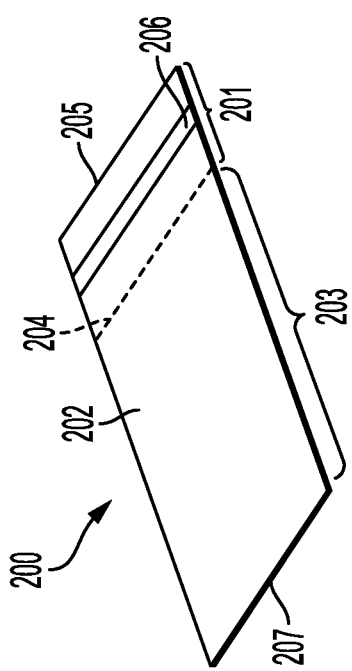
Figure 4:
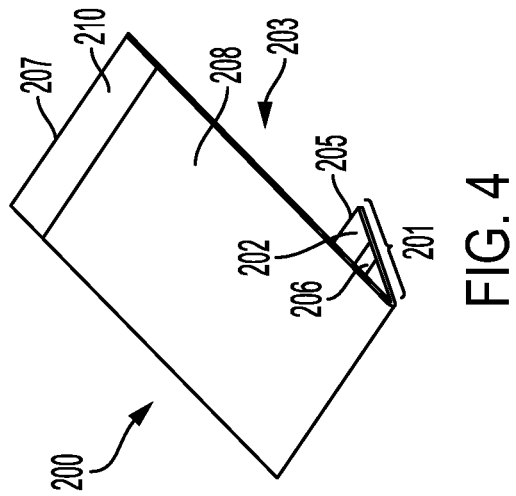
Figure 5:
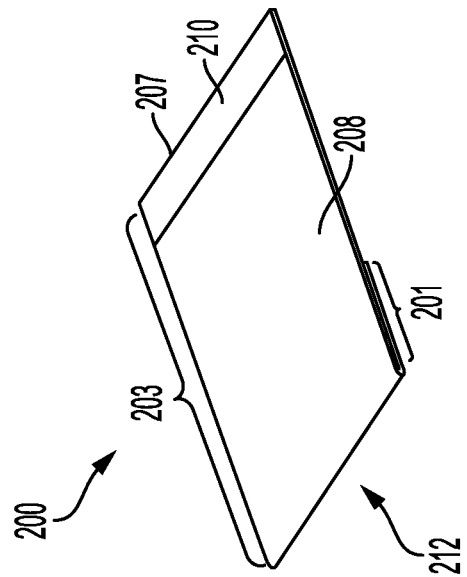

Prior to discussing the various embodiments, a review of the definitions of some exemplary terms used throughout the disclosure is appropriate. Both singular and plural forms of all terms fall within each meaning.

As described herein, when one or more components are described as being connected, joined, affixed, coupled, attached, or otherwise interconnected, such interconnection may be direct as between the components or may be indirect such as through the use of one or more intermediary components. Also as described herein, reference to a "member," "component," or "portion" shall not be limited to a single structural member, component, or element but can include an assembly of components, members or elements. Also as described herein, the terms "substantially" and "about" are defined as at least close to (and includes) a given value or state (preferably within 10% of, more preferably within 1% of, and most preferably within 0.1% of).

Various shingles are disclosed herein that have a thickened appearance, particularly when installed on a roof. The thickened appearance of the shingles is created by adding partial layers of shingle material to the shingle in particular locations and/or by folding at least one portion of the shingle to cause it to appear thicker along the visible portions of the shingle. As a result, the shingle has a thickened appearance without the increased cost of full layers of shingle material.

A shingle configured for folding includes a folded portion that is folded underneath the shingle or layer of a shingle along a fold line. The folded portion can be formed by extending the length of a tab, underlay, overlay, or any other portion of a shingle beyond the typical length of such a feature, or beyond other portions of the shingle, so that when the folded portion is folded, the total length of the shingle is the same as a similar shingle that does not include an extended portion for folding. Folding a portion of a shingle or a portion of a layer of a laminated shingle creates at least a portion of the shingle having a greater thickness. The shingle thus appears to be thicker without adding additional layers to the entirety of the shingle. Thus, a thicker—and to some, a more aesthetically appealing—appearance is achieved with minimal increase to the cost of the shingle. For example, the folded portion of the shingle may be about 5 percent to about 50 percent, or about 10 percent to about 40 percent, or about 20 percent to about 30 percent of the length of the unfolded portion of the shingle. The folded portion of a folding shingle may be folded during installation of the shingle on a roof and/or may be folded during manufacturing. Folding shingles may be configured for use on any portion of a roof, including flat surfaces of the roof and where roof surfaces meet at an angle—e.g., a hip or a ridge.

As mentioned above, a folding shingle may be folded before the shingle is attached to the roof. For example, the folded portion may be folded by a worker on the job site or may be folded during manufacturing. The folded shingle can be installed on the roof like any other shingle, being nailed in a headlap portion that is overlapped by adjacent shingles in a higher course. Alternatively, the folded portion may be nailed to the roof before the rest of the shingle is folded over the affixed folded portion. The remainder of the shingle may then be nailed down, if desired. Mechanically fastening the folded portion of the shingle to the roof (e.g., with nails) attaches the leading edge of the shingle to the roof, which provides resistance to lifting that can occur when the roof is exposed to high winds. Adhesives may also be applied to the surface of the folding portion that is exposed to the roof to help secure the leading edge to the roof.

A variety of materials may be used to form the folding shingle, such as, for example, a substrate such as a glass fiber mat or an organic felt, an asphalt and/or non-asphalt coating on the substrate, and a surface layer of granules embedded in the asphalt coating. The shingle material may be stiff or difficult to bend or may be susceptible to cracking or tearing when bent. Thus, in some embodiments, the fold line includes a line of perforations or cuts or is partially cut to reduce the thickness of the shingle along the fold line to enable or facilitate bending of the shingle material. Once bent, the fold area along the fold line may be weakened and may partially tear or crack without completely breaking. Thus, a reinforcing material may be applied to the fold area to reduce cracking or tearing of the shingle material during folding, and to prohibit the spread of any cracks or tears that happen to form in the material during bending.

Referring now to FIG. 1, a diagram of a roof structure 100 is shown. The roof 100 is a shingled roof, covered with individual shingles 102. The sides of the roof 100 come together to form a ridge 104 at the top of the roof 100. Hips 106 are formed when an inclined roof plane 108 meets the sides of the roof, instead of a gable end. The hips 106 extend from the eaves of the roof to the ridge 104. The roof 100 also has a leading edge 114 at a lower edge of each side. The shingles 102 of the roof 100 are applied in courses on top of an optional underlayment (not shown) and sheeting and/or decking (not shown). The shingles 102 may be single-layer three-tab shingles, or may be laminate shingles, such as the shingles described in U.S. Pat. Nos. 8,430,983 and 9,121,178, which are incorporated herein by reference in their entirety.

Referring now to FIGS. 2-5, an exemplary folding shingle 200 for use on a roof hip or ridge is shown. A rear or back surface 202 is shown facing upwards in FIG. 2 with the shingle 200 in an unfolded condition, and a front or exposed surface 208 is revealed in FIGS. 3-5 as the shingle 200 is folded into a folded condition shown in FIG. 5. The shingle 200 has a folded portion 201 and a main body or unfolded portion 203 and is foldable along a folding line 204. The folded portion 201 of the shingle may be about 5 percent to about 50 percent, or about 10 percent to about 40 percent, or about 20 percent to about 30 percent of the length of the unfolded portion 203 of the shingle. The shingle 200 extends from a bottom edge 205 to a top edge 207. The shingle 200 may be attached to the roof 100 by any suitable means, such as, for example, adhesive, nails, screws, staples, sealant, or other fastening devices. In some embodiments, a nail zone 206 on the rear surface of the folded portion 201 reinforces the material of the shingle to prohibit pull-through of nails used to secure the shingle 200 to the roof. The nail zone 206 may optionally be reinforced with reinforcement tape or any other material suitable for improving the strength of the shingle to resist nail pull through. The exposed surface 208 optionally includes an adhesive portion 210 arrange near or proximate the top edge 207 for adhering to shingles of an adjacent higher course after the shingle 200 is installed and folded.

The shingle 200 is secured to the roof with nails hammered through the nail zone 206 of the folded portion 201. The unfolded portion 203 is then lifted upward and folded back along the fold line 204 until the unfolded portion 203 contacts the folded portion 201. Additional nails may then be used to secure the unfolded portion 203 to the roof in an optional nail zone (not shown). A shingle for the next course can then be installed on top of the shingle 200 in the same way. The shingle 200 may optionally include an alignment line on the exposed surface 208 of the unfolded portion 203 to aid in aligning the next course of shingles.

Figure 6:
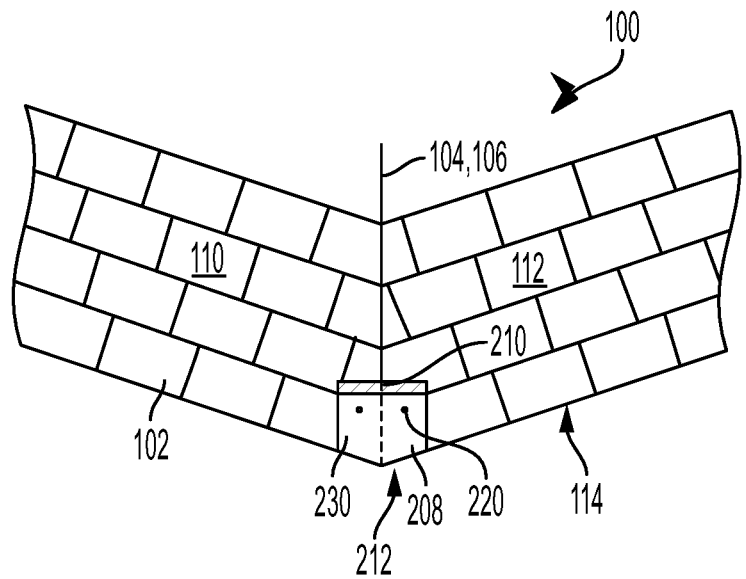
FIGS. 6-11 illustrate the steps to install exemplary hip and ridge shingles on the hip or ridge of a roof.
Figure 6A:
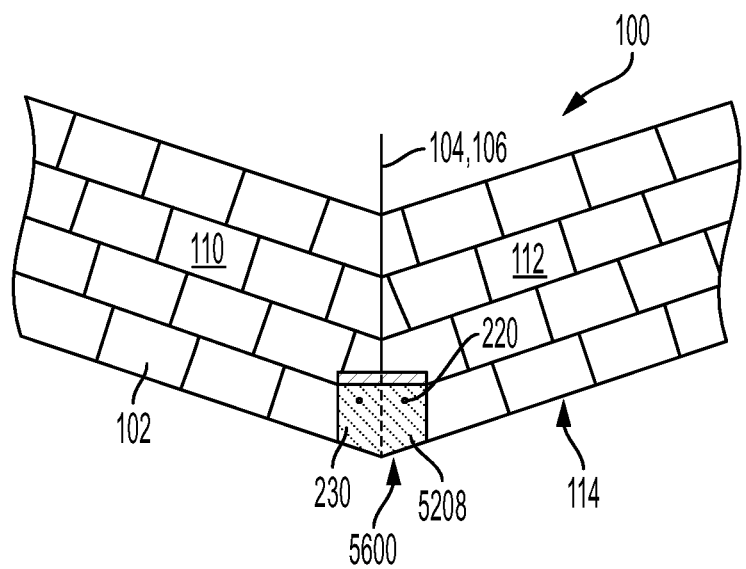

FIGS. 6-11 illustrate the steps to install exemplary folding hip and ridge shingles 200 on the hip or ridge 104, 106 of a roof 100. Referring now to FIG. 6, an optional starter shingle 230 is shown. The starter shingle 230 may or may not include a folded portion to provide a thicker appearance to a leading edge 212. The leading edge 212 corresponds to the bottom portion of the shingle 200, 230 which is visible by a person viewing the roof 100 from ground level. In the illustrated embodiment, the leading edge 212 of the starter shingle 230 is aligned with the leading edge 114 of the roof 100. The starter shingle 230 and shingles 200 may be attached to the roof 100 by any suitable means, such as, for example, adhesive, nails, screws, staples, sealant, and/or other fastening devices. When mechanical fasteners are used, they may be with the shingle 200 being nailed on the left 110 and right 112 sides of the hip or ridge 104, 106.

Figure 7:
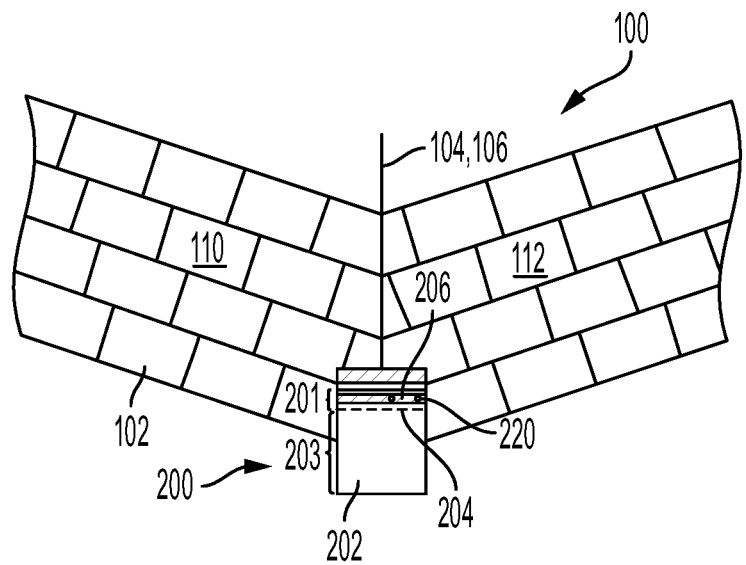

Referring to FIG. 7, in some embodiments, a nail zone 206 on the rear surface of the folded portion 201 reinforces the material of the shingle to prohibit pull-through of nails used to secure the shingle 200 to the roof. In some embodiments, a ridge vent (not shown) is installed between the hip and ridge shingle 200 and the roof 100. The starter shingle 230 includes an adhesive portion 210 on the exposed surface 208 to help secure subsequently installed shingles.

Figure 8:
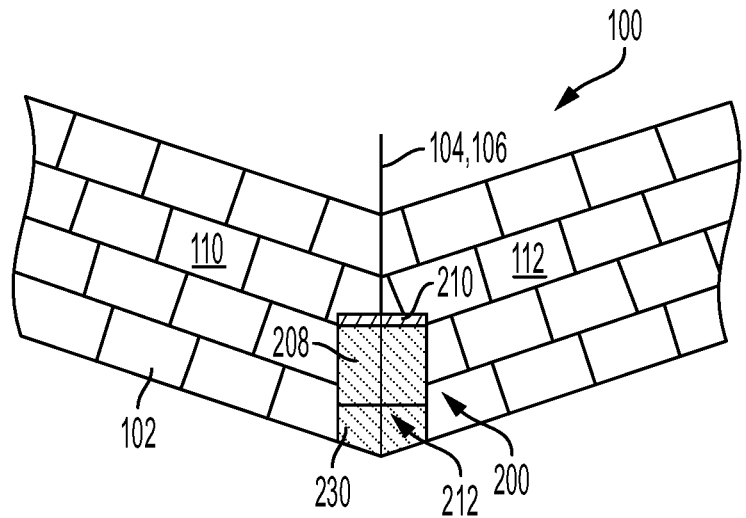

Referring now to FIG. 7, the first course folding shingle 200 is nailed to the roof 100 in the unfolded condition. The nails 220 are applied in the nail zone 206 of the folded portion 201 on one side—the right side 112 in FIG. 7—of the hip or ridge 104, 106. The nails 220 are only applied on one side so that the shingle 200 can be folded along the fold line 204. That is, if the shingle was nailed on both sides it would be folded convexly over the hip or ridge 104, 106, thereby making it difficult to fold the shingle along the fold line 204 without tearing. In some embodiments, however, the fold line may include cuts, perforations, or lines of weakness that allow the shingle to be folded with both sides nailed down. The unfolded portion 203 of the shingle 200 is folded up to meet the roof, thereby creating a thicker leading edge 212 and the exposed surface 208 faces outward, as shown in FIG. 8. The unfolded portion 203 in in contact with the roof and can be optionally nailed down as well, on one or both sides 110, 112 of the hip or ridge 104, 106.

Figure 9:
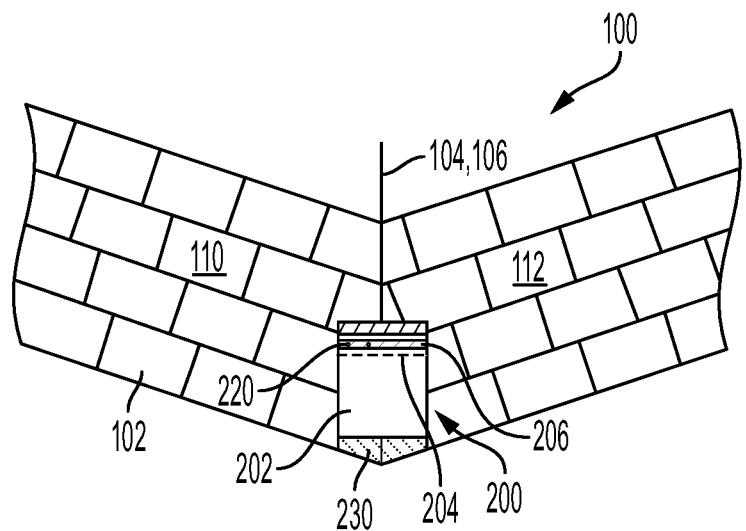
Figure 10:
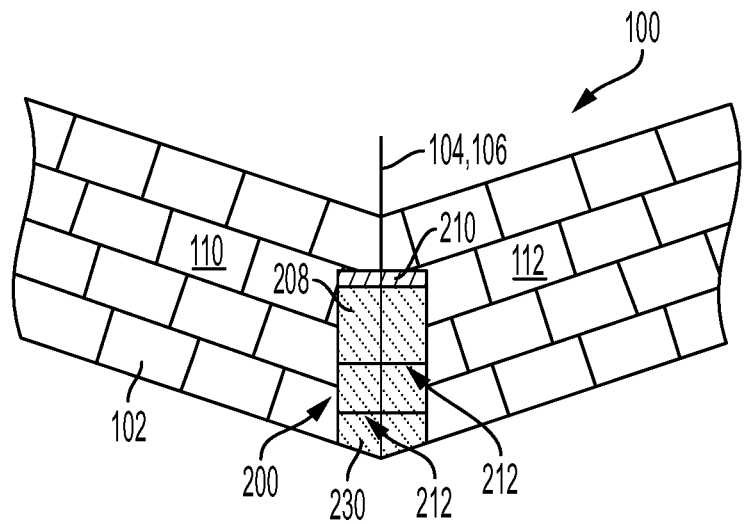
Figure 11:
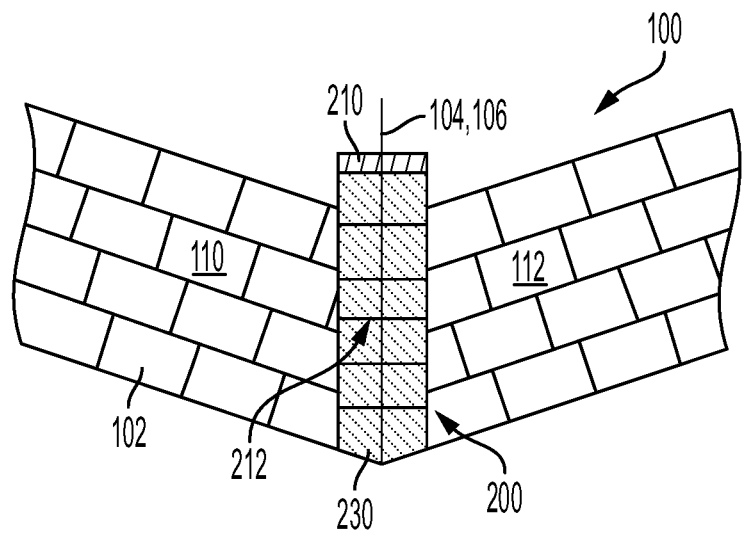
Figure 11A:
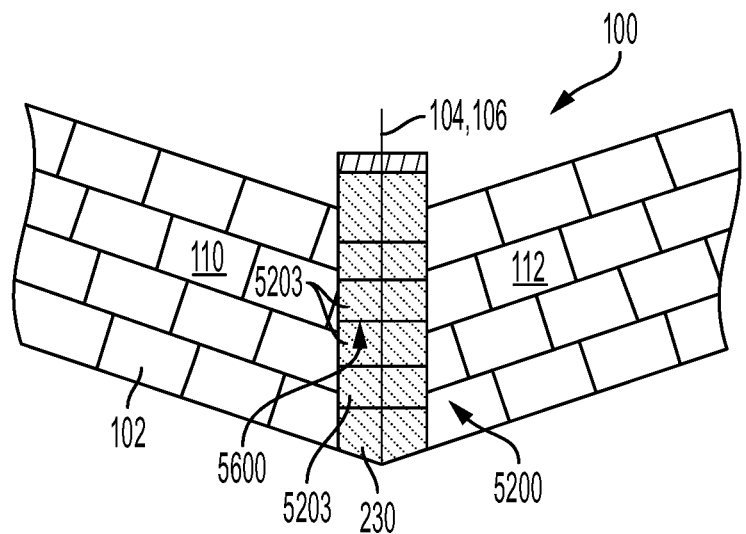

The steps shown in FIGS. 7 and 8 are repeated with the second course of folding shingles 200, as shown in FIGS. 9 and 10. The shingles of the second course, however, are nailed on the left side 110 of the hip or ridge 104, 106. The nails 220 in the second course penetrate the first course as well, thereby securing both sides of the first course shingle. Shingles of additional courses are then applied in a similar manner until the hip or ridge 104, 106 is covered in shingles 200, as can be seen in FIG. 11. During installation of additional courses, the nails 220 are applied to alternating sides 110, 112 of the hip or ridge 104, 106.

Figure 12:
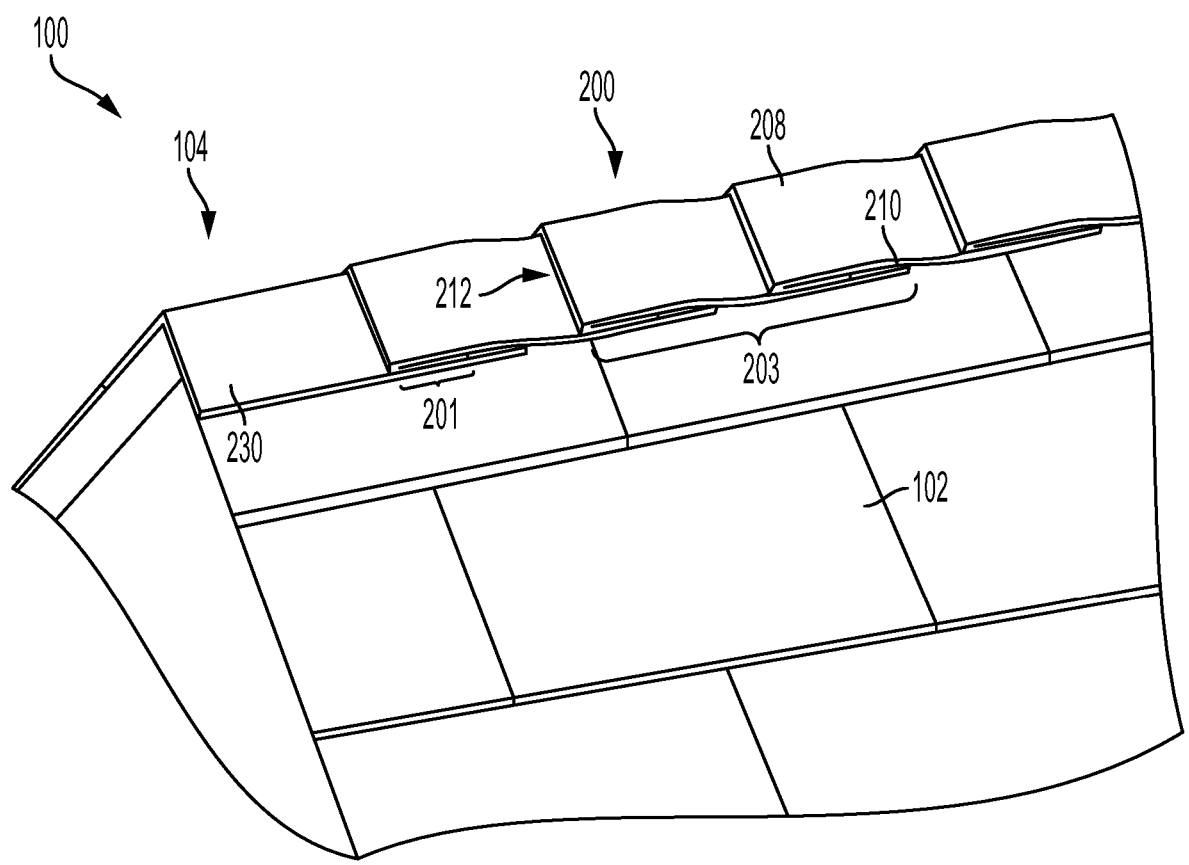
FIG. 12 shows a perspective view of exemplary hip and ridge shingles installed on the ridge of a roof.

Referring now to FIG. 12, a perspective view of exemplary hip and ridge 200 shingles installed on the ridge 104 of a gabled roof following the steps illustrated in FIGS. 6-11. The folded portions 201 of the shingles 200 can be seen folded under the unfolded portions 203, thus providing the thicker appearance of the leading edge 212 than would otherwise be provided by non-folding shingles.

Similar concepts shown above in FIGS. 2-12 may also be applied to shingles used on the flat surfaces 108 of a roof 100, which in some embodiments may be laminated shingles having overlay and underlay layers. One or both of these layers may include a folded portion. Such a folded portion may be folded during manufacturing of the shingles, or during installation.

Figure 13:
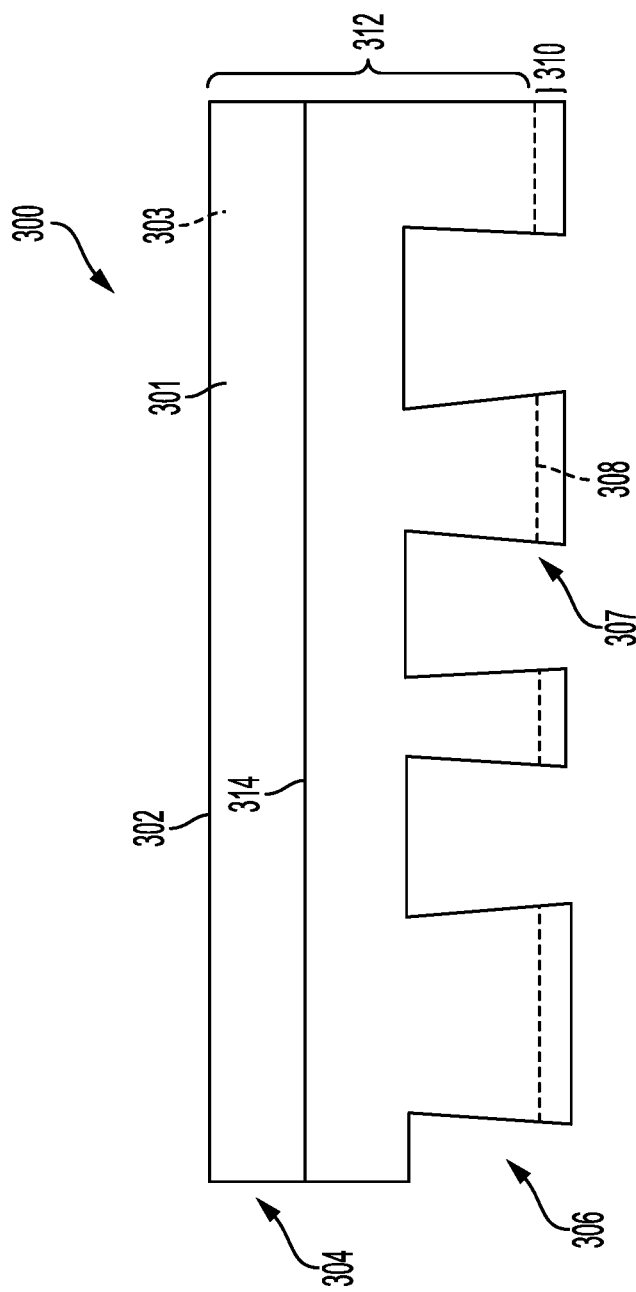
FIG. 13 shows a plan view of an overlay layer of an exemplary laminated shingle having a folded portion.
Figure 14:
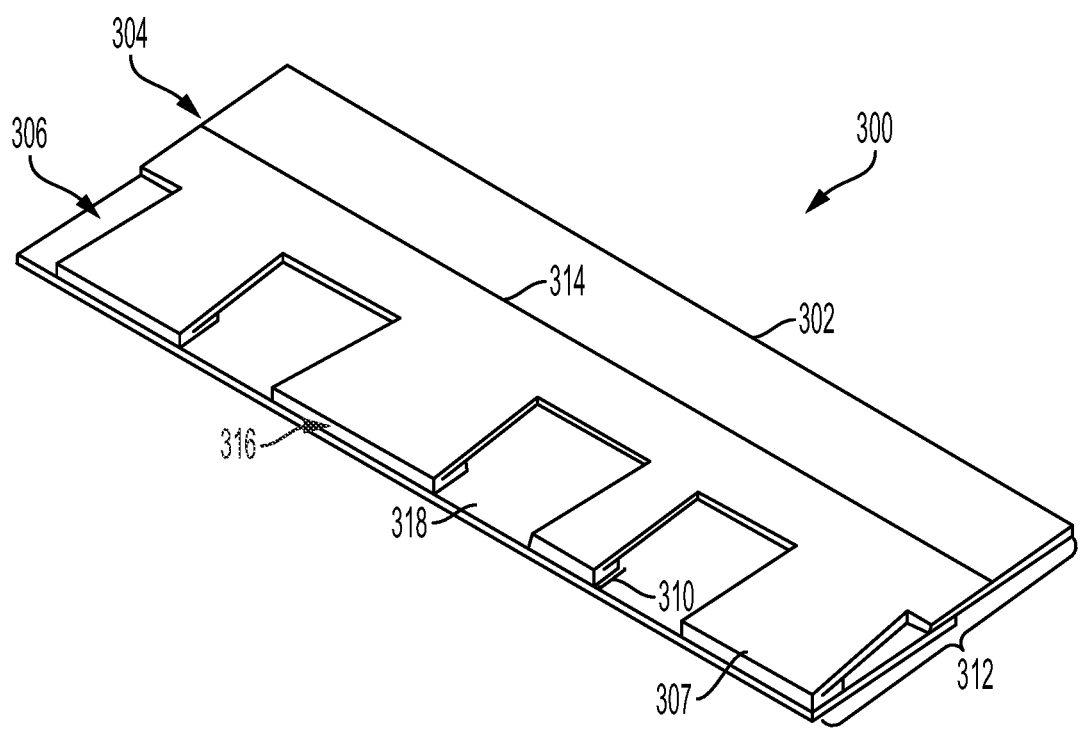
FIG. 14 shows a perspective view of exemplary laminated shingle having a folded portion of an overlay layer.

Referring now to FIGS. 13-16, exemplary laminated folding shingles are shown. Referring now to FIGS. 13-14, exemplary laminated folding shingles 300 are shown having a folding overlay layer. The shingles have an overlay layer 302 attached to an underlay layer 318 using an adhesive or any other suitable attachment means, which may or may not extend the full height of the overlay layer 302. The overlay layer 302 has a front surface 301, a rear surface 303, a headlap portion 304, and a tab portion 306 having a plurality of tabs 307. The overlay layer 302 includes a folded portion 310 and an unfolded portion 312, the folded portion being folded along a fold line 308 so that it is arranged between the underlay layer 318 and the unfolded portion 312 of the overlay layer 302. The folded portion 310 of the shingle may be about 5 percent to about 50 percent, or about 10 percent to about 40 percent, or about 20 percent to about 30 percent of the length of the unfolded portion 312 of the shingle. In some embodiments, adhesive is provided on the front and/or back surfaces 301, 303 of the folded portion 310 so that the folded portion 310 adheres to the unfolded portion 312 and the underlay layer 318 after folding. The shingle 300 may optionally include an alignment guide 314 to assist in aligning adjacent courses of shingles. The overlay sheet 302 may optionally include a nail zone (not shown) that may optionally be reinforced with reinforcement tape or any other material suitable for improving the strength of the shingle to resist nail pull through.

Referring now to FIG. 14, a perspective view of the shingle 300 is shown with the overlay layer 302 attached to the underlay layer 318. The folded portion 310 of the tabs 307 of the overlay layer 302 can be seen folded under the unfolded portion 312, thus providing a thicker appearance of a leading edge 316 of the shingle 300 than would otherwise be provided by non-folding shingles.

In the example illustrated by FIGS. 13 and 14, the folded portion 310 of the tabs will typically be folded under during the manufacturing process and be permanently secured to the underlay layer 302 and the unfolded portion 312 by an adhesive during the manufacturing process. The shingle 300 would be attached to the roof in a conventional manner by fastening, such as nails, driven through a nail zone at the shingle near the line 314.

Figure 15:
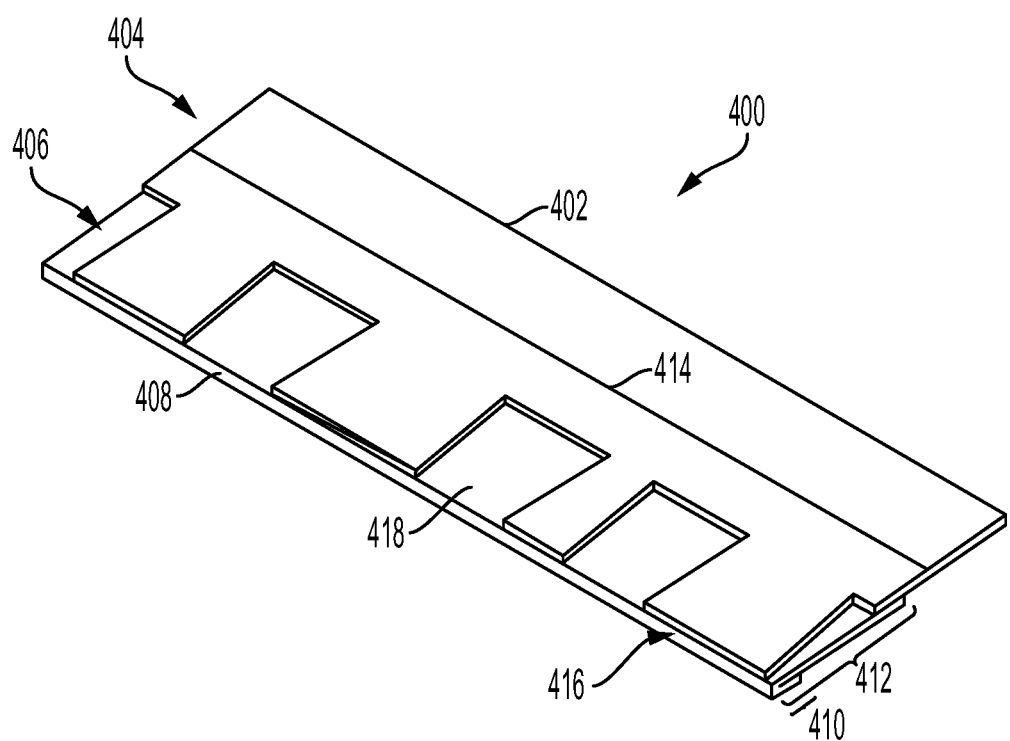
FIG. 15 shows a perspective view of an exemplary laminated shingle having a folded portion of an underlay layer.

Referring now to FIGS. 15, exemplary laminated folding shingles 400 are shown having a folding underlay layer. The shingles 400 have an overlay layer 402 attached to an underlay layer 418 using an adhesive or any other suitable attachment means, which may or may not extend the full height of the overlay layer 402. The overlay layer 402 has a headlap portion 404, and a tab portion 406 having a plurality of tabs. The overlay layer 402 includes a folded portion 410 and an unfolded portion 412, the folded portion being foldable along a fold line 408 so that it is arranged between the unfolded portion 412 of the underlay layer 418 an adjacent shingle. The folded portion 410 of the underlay layer 402 can be seen folded under the unfolded portion 412, thus providing a thicker appearance of a leading edge 416 of the shingle 400 than would otherwise be provided by non-folding shingles. The folded portion 410 of the shingle may be about 5 percent to about 50 percent, or about 10 percent to about 40 percent, or about 20 percent to about 30 percent of the length of the unfolded portion 412 of the shingle. In some embodiments, adhesive is provided on the front and/or back surfaces of the folded portion 410 so that the folded portion 410 adheres to the unfolded portion 412 and/or an adjacent shingle after folding. The shingle 400 may optionally include an alignment guide 414 to assist in aligning adjacent courses of shingles. The overlay sheet 402 may optionally include a nail zone (not shown) that may optionally be reinforced with reinforcement tape or any other material suitable for improving the strength of the shingle to resist nail pull through.

In the example illustrated by FIG. 15, the folded portion 410 of the tabs can be folded under during the manufacturing process of during installation. When the folded portion 410 is folded and secured to the unfolded portion 412 during the manufacturing process, the shingle would be attached to the roof in a conventional manner by fasteners, such as nails driven through a nail zone at or near the line 414. In the example illustrated by FIG. 15, when the folded portion 410 is folded during installation, the shingles can be installed in generally the same manner as illustrated by FIGS. 6-11. However, since the shingles 400 are installed on a flat surface, nails or other fasteners are driven through the folding portion 410 along the entire length of the folding portion.

Figure 16:
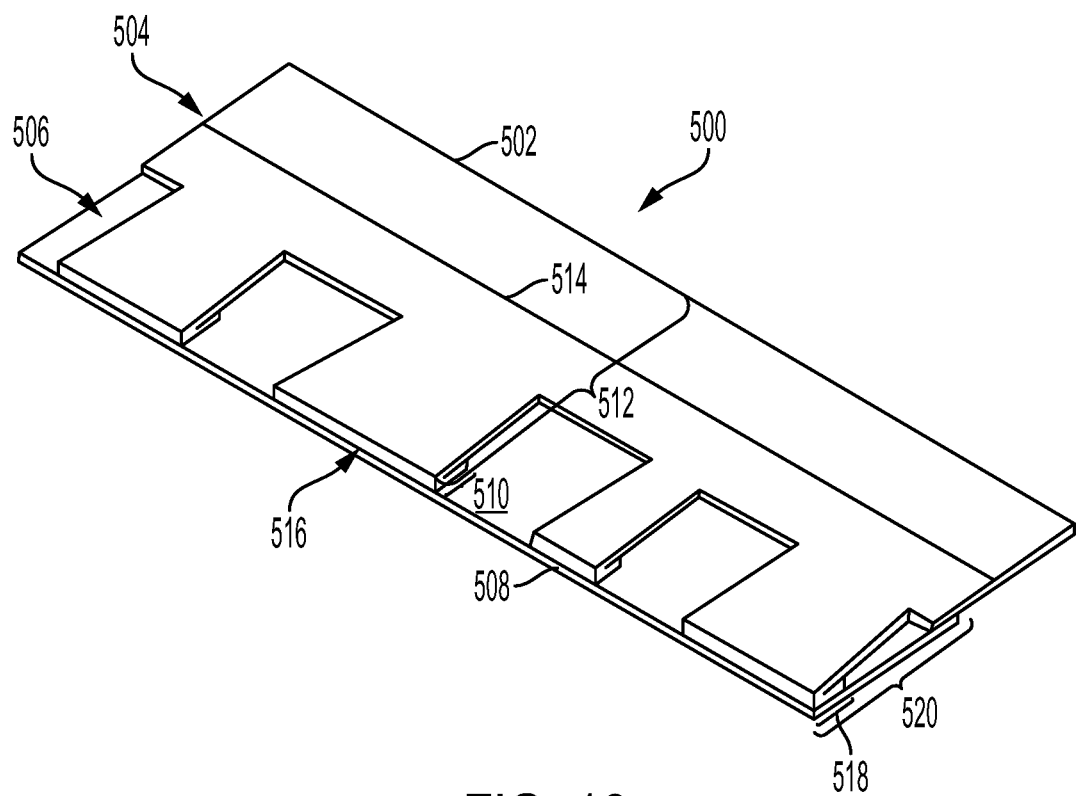
FIG. 16 shows a perspective view of an exemplary laminated shingle having both a folded portion of an overlay layer and folded portion of an underlay layer.

Referring now to FIG. 16, an exemplary embodiment of a shingle 500 is shown that combines the features of the embodiment of FIG. 14 and the embodiment of FIG. 15. That is, the shingle 500 illustrated by FIG. 16 has both a folded overlay portion 510 and a folded underlay portion 518. The shingles 500 have an overlay layer 502 attached to an underlay layer 508 using an adhesive or any other suitable attachment means, which may or may not extend the full height of the overlay layer 502. The overlay layer 502 has a headlap portion 504, and a tab portion 506 having a plurality of tabs. The overlay layer 502 includes the folded overlay portion 510 and an unfolded overlay portion 512, the folded portion 510 being foldable along a fold line so that folded portion 510 is arranged between the underlay layer 508 and the unfolded portion 512 of the overlay layer 502. The underlay layer 508 includes a folded underlay portion 518 and an unfolded underlay portion 520, the folded portion 518 being foldable along a fold line so that it is arranged between the overlay layer 502 of an adjacent shingle and the unfolded portion 520 of the underlay layer 508. The folded portions 510, 518 can be seen folded under the unfolded portions 512, 520, thus providing a thicker appearance of a leading edge 516 of the shingle 400 than would otherwise be provided by non-folding shingles. The folded portions 510, 518 of the shingle 500 may be the same length or different lengths, and may be about 5 percent to about 50 percent, or about 10 percent to about 40 percent, or about 20 percent to about 30 percent of the length of the unfolded portions 512, 520 of the shingle 500. In some embodiments, adhesive is provided on the front and/or back surfaces of the folded portions 510, 518 so that the folded portions 510, 518 adheres to the unfolded portions 512, 520 and/or an adjacent shingle after folding. The shingle 500 may optionally include an alignment guide 514 to assist in aligning adjacent courses of shingles. The overlay sheet 502 may optionally include a nail zone (not shown) that may optionally be reinforced with reinforcement tape or any other material suitable for improving the strength of the shingle to resist nail pull through. The shingle 500 can be installed in the same manner that the shingles 400 illustrated by FIG. 15 can be installed; i.e., in a conventional manner or by folding during installation as illustrated by FIGS. 6-11.

Referring now to FIGS. 17-23, exemplary laminated shingles with a thicker appearance are shown. The exemplary shingles of FIGS. 17-23 include an intermediate layer or strip between the underlay and overlay to provide a thicker appearance that may be formed from a separate piece of material or a folded portion of a layer of the shingles. The shingles are shown in perspective views, with side views shown of some embodiments (e.g., FIGS. 18, 22). When shown in the side view, the layers are shown in the abstract where the tab portions are spaced apart from the underlay layer, though these layers would bend to contact each other when the shingles are made, and a gap would not exist along the entire length of the tabs.

Figure 17:
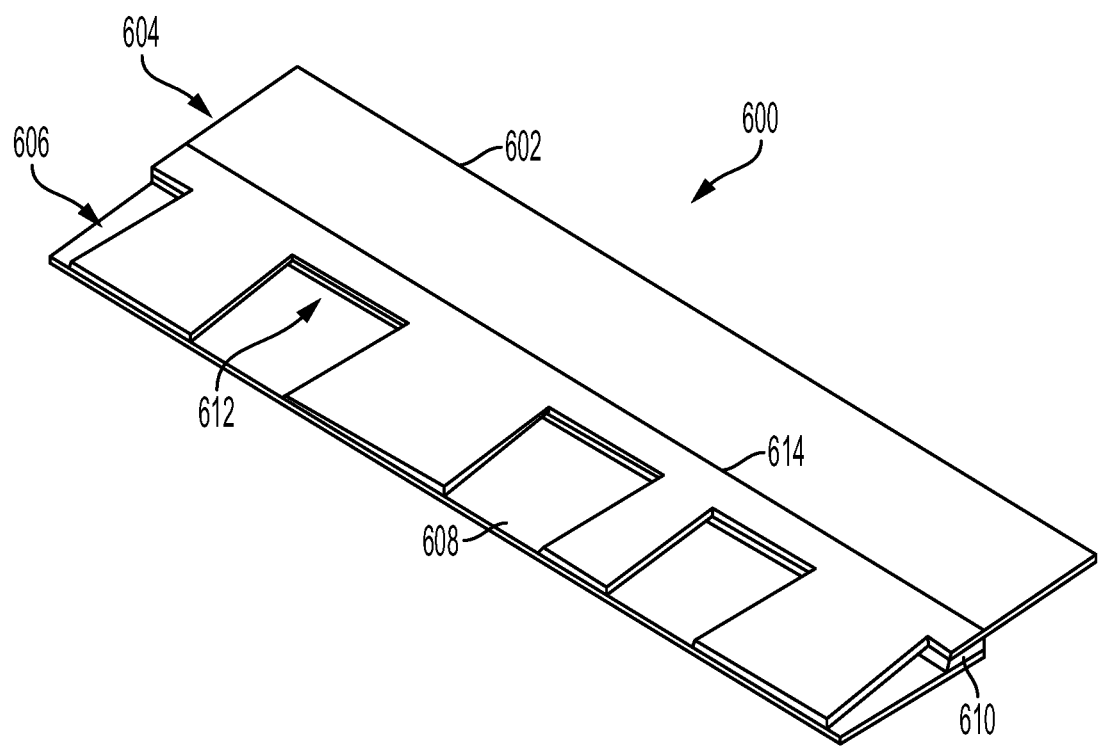
FIG. 17 shows a perspective view of exemplary laminated shingle having an intermediate layer.
Figure 18:
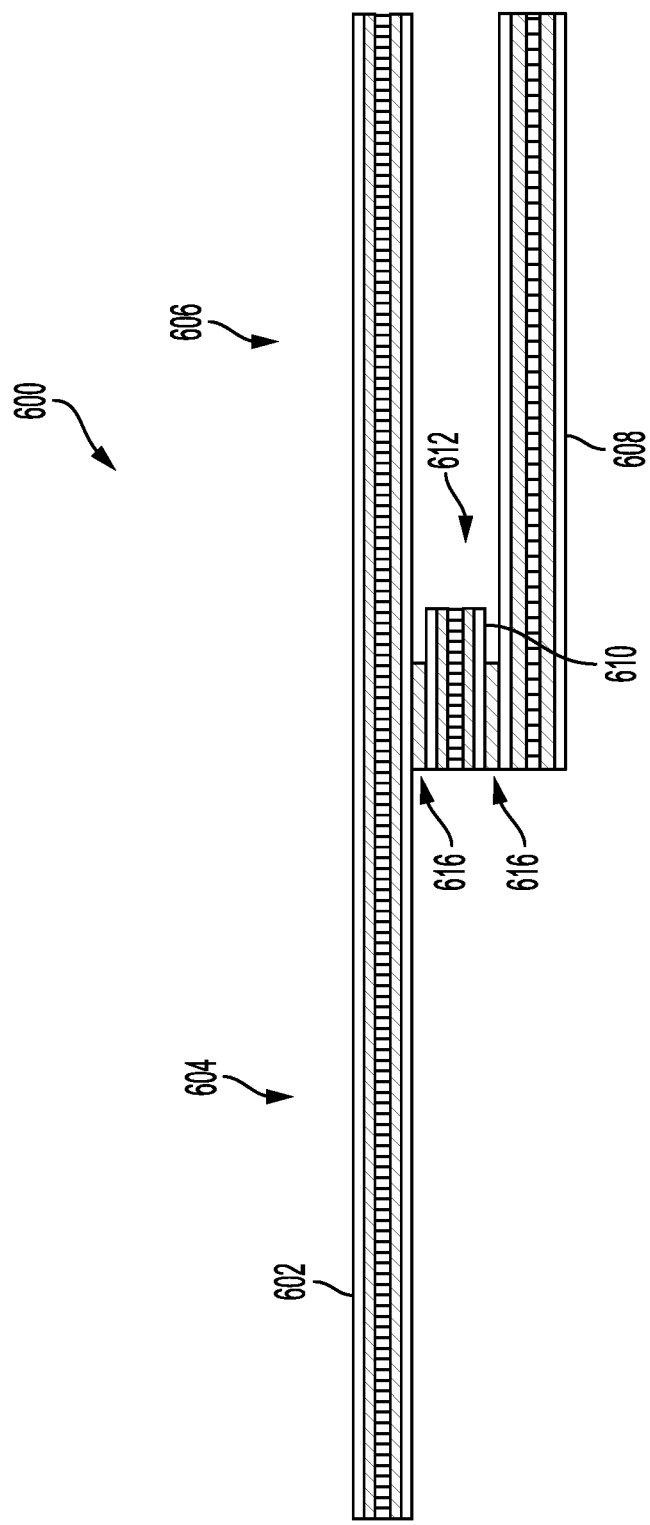
FIG. 18 shows a side view of exemplary laminated shingle having an intermediate layer.

Referring now to FIGS. 17 and 18, exemplary laminated shingles 600 are shown having an intermediate layer 610. The shingles have an overlay layer 602 attached to an underlay layer 608 using an adhesive or any other suitable attachment means, which may or may not extend the full height of the overlay layer 602. The overlay layer 602 has a headlap portion 604, and a tab portion 606 having a plurality of tabs. An intermediate layer 610 is provided between the overlay and underlay layers 602, 608. The intermediate layer 610 is arranged between the headlap portion 604 of the overlay layer 602 and the underlay layer 608 and does not substantially extend under the tab portion 606. As can be seen in FIG. 18, an adhesive 616 attaches the layers 602, 608, 610 together. The intermediate layer 610 is formed from a strip of material that extends from the top of the tab cutouts to an upper end of the underlay layer 606 for the full width of the shingle 600. In certain embodiments, the intermediate layer 610 extends under the entire width of the headlap portion 604 of the overlay layer 602. The intermediate layer 610 under the headlap portion 602 increases the thickness of the shingle 600 to create a thickened portion 612 at the top of the openings between tabs of the tabbed portion 606. The shingle 600 may optionally include an alignment guide 614 to assist in aligning adjacent courses of shingles. In one exemplary embodiment, the intermediate layer 610 can extend to the alignment guide 614. The overlay sheet 602 may optionally include a nail zone (not shown) that may optionally be reinforced with reinforcement tape or any other material suitable for improving the strength of the shingle to resist nail pull through. In one exemplary embodiment, the intermediate layer can extend under all or a portion of the nail zone.

Figure 19:
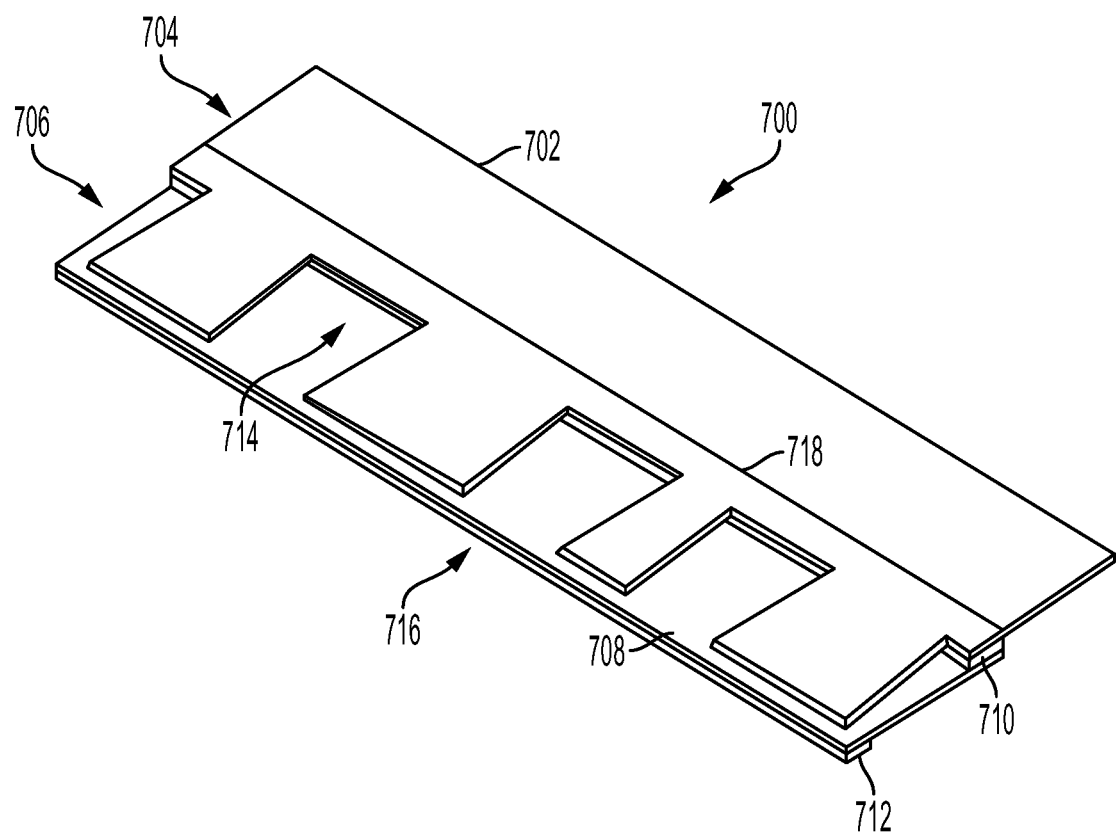
FIG. 19 shows a perspective view of exemplary laminated shingle having an intermediate layer.

Referring now to FIG. 19, exemplary laminated shingles 700 are shown having an intermediate layer 710. The shingles have an overlay layer 702 attached to an underlay layer 708 using an adhesive or any other suitable attachment means, which may or may not extend the full height of the overlay layer 702. The overlay layer 702 has a headlap portion 704, and a tab portion 706 having a plurality of tabs. The intermediate layer 710 is provided between the overlay and underlay layers 702, 708. The intermediate layer 710 is arranged between the headlap portion 704 of the overlay layer 702 and the underlay layer 708 and does not substantially extend under the tab portion 706. The intermediate layer 710 is formed from a strip of material that extends from the top of the tab cutouts to an upper end of the underlay layer 706 for the full width of the shingle 700. In certain other embodiments, the intermediate layer 710 extends under the entirety of the headlap portion 704 of the overlay layer 702. A bottom edge layer 712 is attached to the bottom of the underlay layer 708. The bottom edge layer 712 is formed from a strip of material that extends for the full width of the shingle 700 along the bottom edge of the underlay layer 708. In certain embodiments, the bottom edge layer 712 extends underneath the entirety of the underlay layer 708. The intermediate layer 710 and/or the bottom edge layer 712 can be from 0.5 to 2.0 inches wide, however, other widths are possible. The intermediate layer 710 and the bottom edge layer 712 increase the thickness of the shingle to create a first thickened portion 714 at the top of the openings between tabs of the tabbed portion 706 and a second thickened portion 716 at the bottom edge of the shingle 700. The shingle 700 may optionally include an alignment guide 718 to assist in aligning adjacent courses of shingles. The intermediate layer 710 can extend to the alignment guide 718. The overlay sheet 702 may optionally include a nail zone (not shown) that may optionally be reinforced with reinforcement tape or any other material suitable for improving the strength of the shingle to resist nail pull through. The intermediate layer 710 can extend under all or a portion of the nail zone.

Figure 20:
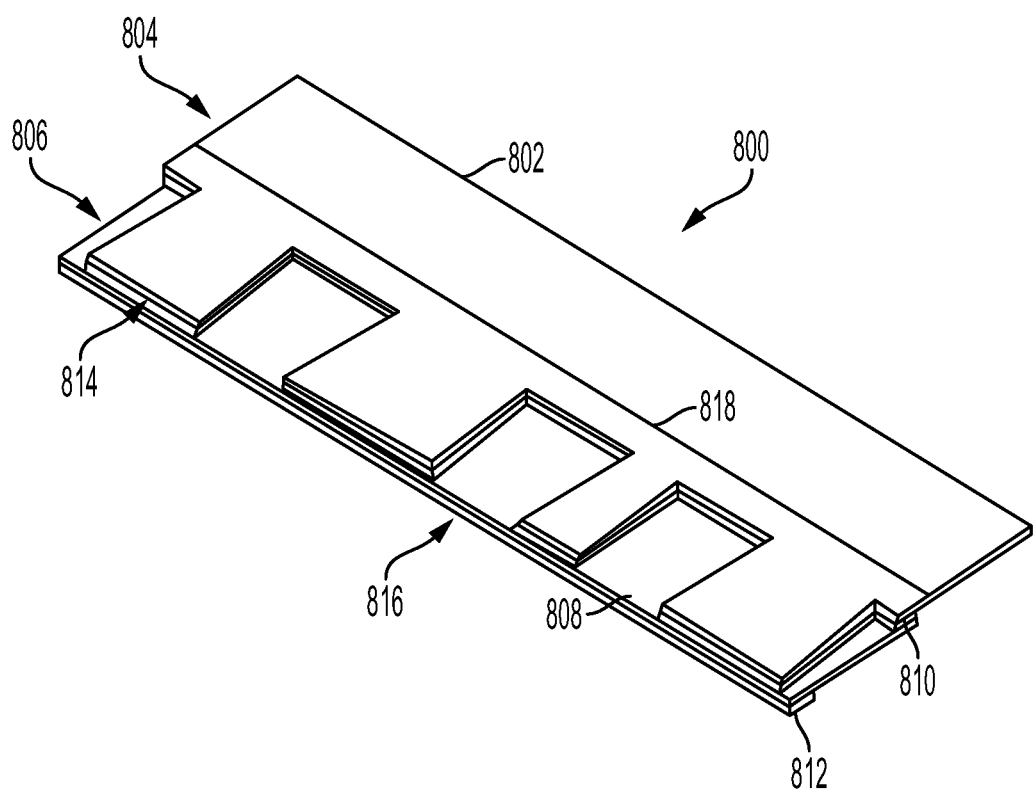
FIG. 20 shows a perspective view of exemplary laminated shingle having an intermediate layer.

Referring now to FIG. 20, exemplary laminated shingles 800 are shown having an intermediate layer. The shingles have an overlay layer 802 attached to an underlay layer 808 using an adhesive or any other suitable attachment means, which may or may not extend the full height of the overlay layer 802. The overlay layer 802 has a headlap portion 804, and a tab portion 806 having a plurality of tabs. An intermediate layer 810 is provided between the overlay and underlay layers 802, 808. The intermediate layer 810 is arranged between the headlap portion 804 of the overlay layer 802 and the underlay layer 808 and substantially matches the size and shape of the tab portion 806. The intermediate layer 810 extends underneath the tabs of the tab portion 806 from the bottom edge of the shingle to the upper edge of the underlay layer 808. In certain other embodiments, the intermediate layer 810 can extend under the entirety of the headlap portion 804 of the overlay layer 802. A bottom edge layer 812 is attached to the bottom of the underlay layer 808. The bottom edge layer 812 is formed from a strip of material that extends for the full width of the shingle 800 along the bottom edge of the underlay layer 808. In certain other embodiments, the bottom edge layer 812 can extend underneath the entirety of the underlay layer 808. The intermediate layer 810 and the bottom edge layer 812 increase the thickness of the shingle to create a first thickened portion 814 at the top of the openings between tabs of the tabbed portion 806 and a second thickened portion 816 at the bottom edge of the shingle 800, which is thicker than the second thickened portion 716 of shingle 700. The shingle 800 may optionally include an alignment guide 818 to assist in aligning adjacent courses of shingles. In one exemplary embodiment, the intermediate layer 810 can extend to the alignment guide 818. The overlay sheet 802 may optionally include a nail zone (not shown) that may optionally be reinforced with reinforcement tape or any other material suitable for improving the strength of the shingle to resist nail pull through. In one exemplary embodiment, the intermediate layer 810 can extend under all or a portion of the nail zone.

Figure 21:
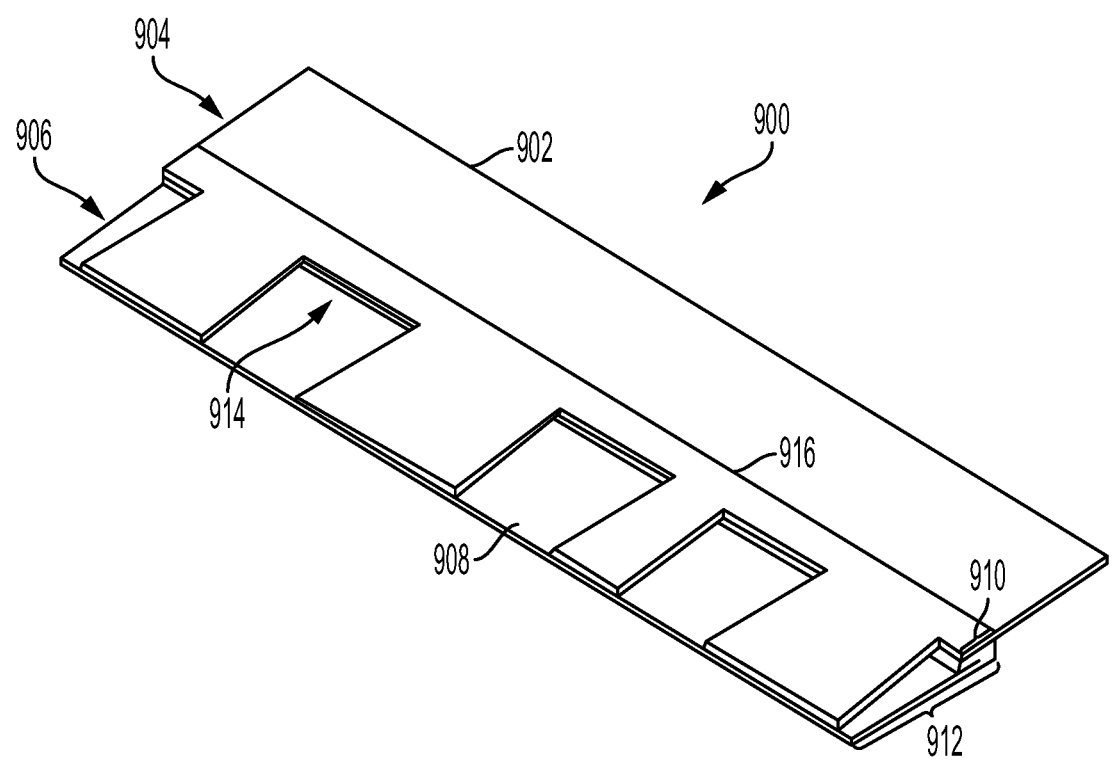
FIG. 21 shows a perspective view of exemplary laminated shingle having an intermediate layer with a folded portion.
Figure 22:
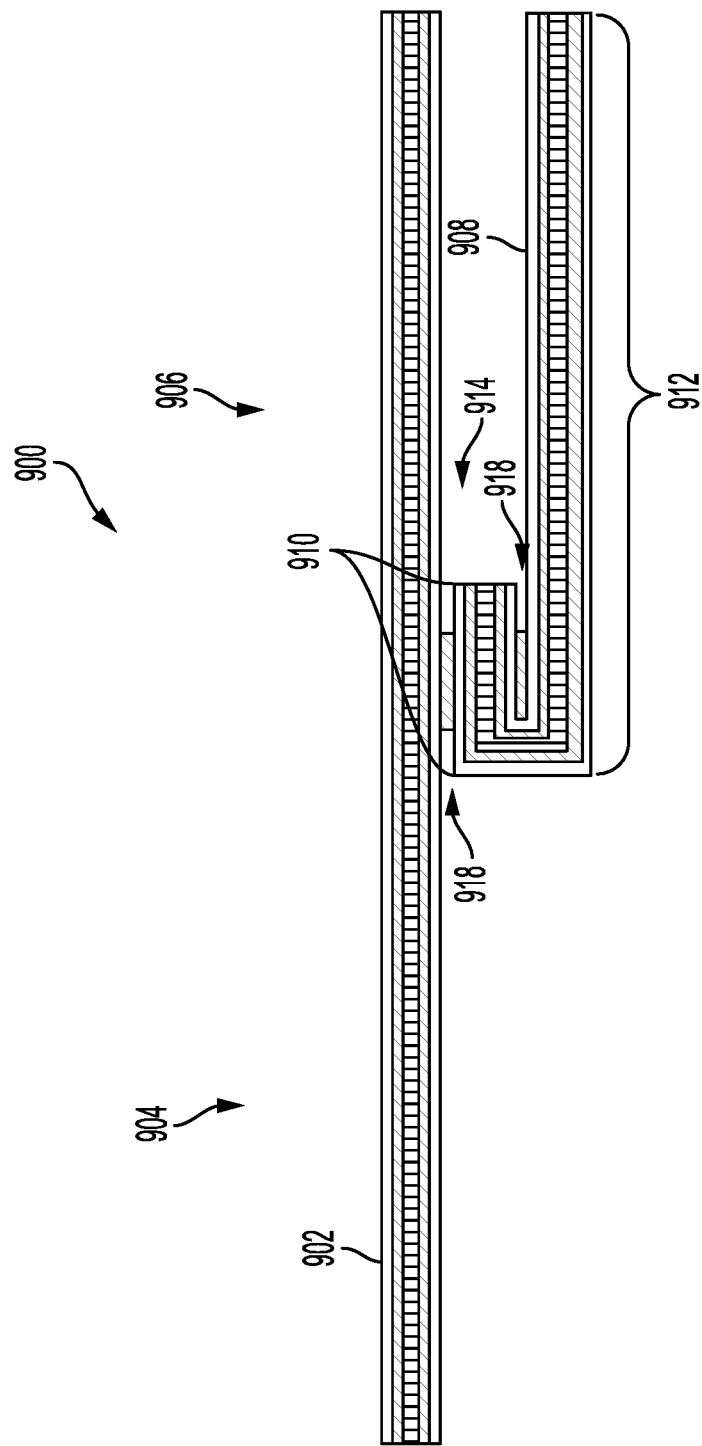
FIG. 22 shows a side view of exemplary laminated shingle having an intermediate layer with a folded portion.

Referring now to FIGS. 21 and 22, exemplary laminated shingles 900 are shown having an intermediate folded layer 910. The shingles have an overlay layer 902 attached to an underlay layer 908 using an adhesive or any other suitable attachment means, which may or may not extend the full height of the overlay layer 902. The overlay layer 902 has a headlap portion 904, and a tab portion 906 having a plurality of tabs. The underlay layer 908 includes a folded portion 910 and an unfolded portion 912, the folded portion 910 being folded along a fold line so that the folded portion 910 is arranged between the overlay layer 902 and the unfolded portion 912 of the underlay layer 902, thus forming an additional layer of material, or intermediate layer, between the overlay layer 902 and underlay layer 908. The folded portion 910 can be folded during manufacturing before the overlay and underlay layers 902, 908 are joined together. The folded portion 910 and the unfolded portion 912 can be connected together by a tape or scrim, so that the folded portion 910 remains connected to the unfolded portion 912 after the folded portion 910 is folded. Any folded portions and unfolded portions described in this application can be connected together by tape, scrim, or other material. The folded portion 910 extends from the fold to the tab cutouts of the tab portion 906. In certain other embodiments, the folded portion 910 can extend under the entirety of the tab portion 906, like the intermediate layer 810 of shingle 800 as shown in FIG. 20. The folded portion 910 may be about 5 percent to about 50 percent, or about 10 percent to about 40 percent, or about 20 percent to about 30 percent of the length of the unfolded portion 912 of the underlay layer 908. The folded portion can be between 0.5 and 2.0 inches wide. As can be seen in FIG. 22, an adhesive 918 attaches the layers 902 and 908 together. The adhesive 918 also attaches the folded portion 910 to the unfolded portion 912.

The folded portion or intermediate layer 910 under the headlap portion 902 increases the thickness of the shingle 900 to create a thickened portion 914 at the top of the openings between tabs of the tabbed portion 906. The shingle 900 may optionally include an alignment guide 916 to assist in aligning adjacent courses of shingles. In one exemplary embodiment, the folded portion 910 extends to the alignment guide 916. The overlay sheet 902 may optionally include a nail zone (not shown) that may optionally be reinforced with reinforcement tape or any other material suitable for improving the strength of the shingle to resist nail pull through. In one exemplary embodiment, the folded portion 910 extends under all or a portion of the nail zone.

Figure 23:
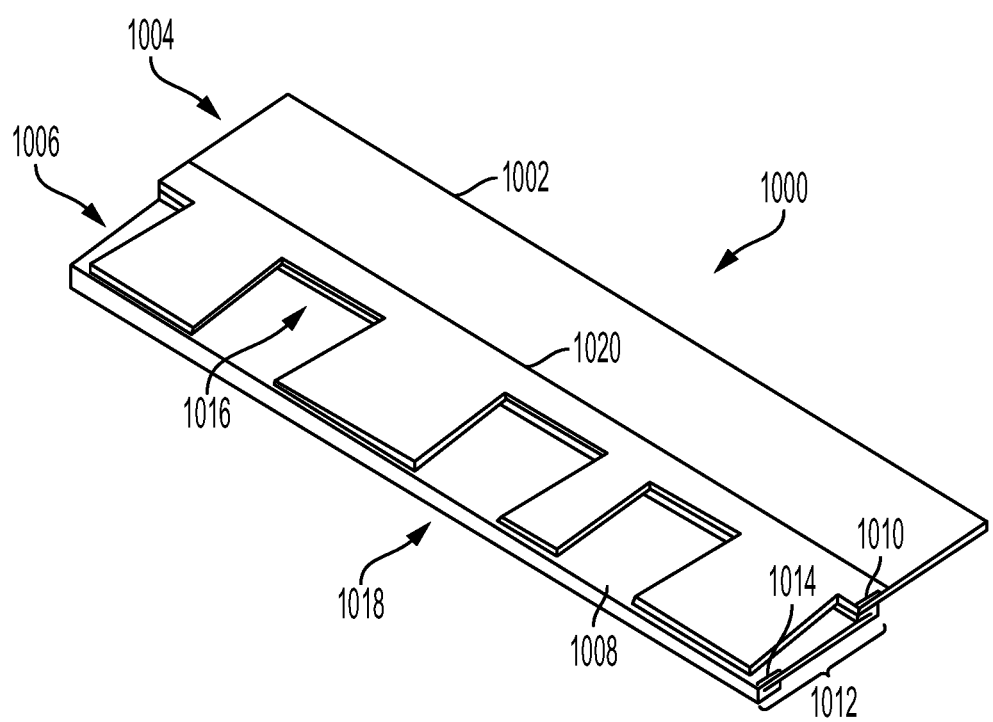
FIG. 23 shows a perspective view of exemplary laminated shingle having an intermediate layer with folded portions.
Figure 25:
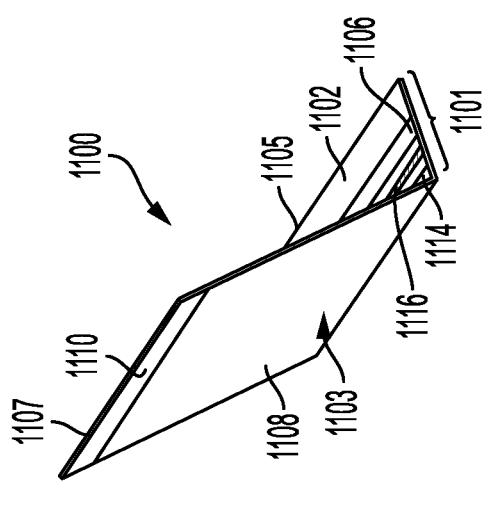
FIGS. 24-27 are perspective views of an exemplary hip and ridge shingle being folded from an unfolded to folded condition.
Figure 27:
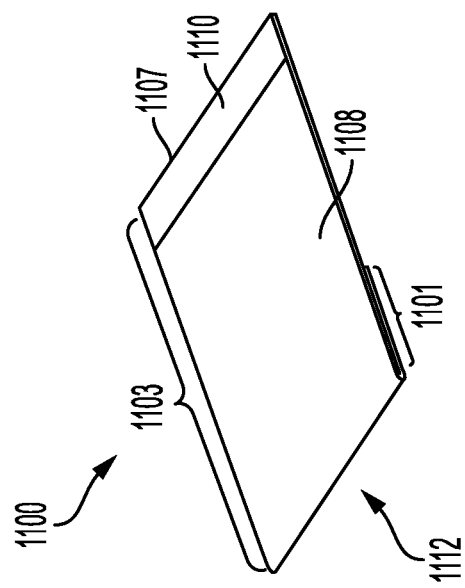
Figure 24:
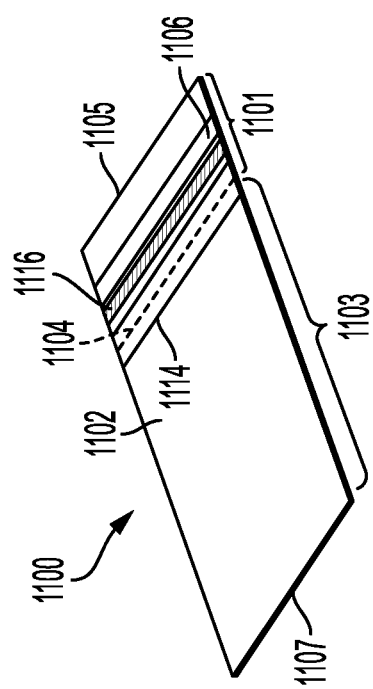
Figure 26:
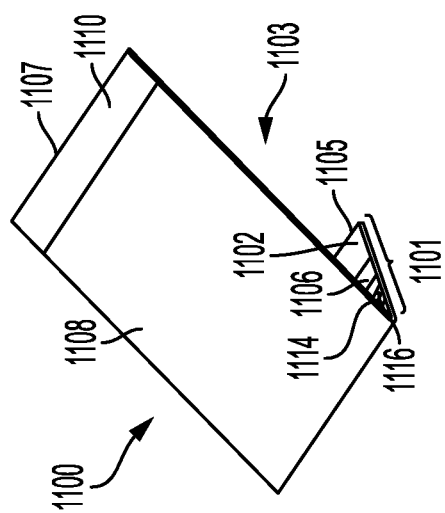
Figure 28:
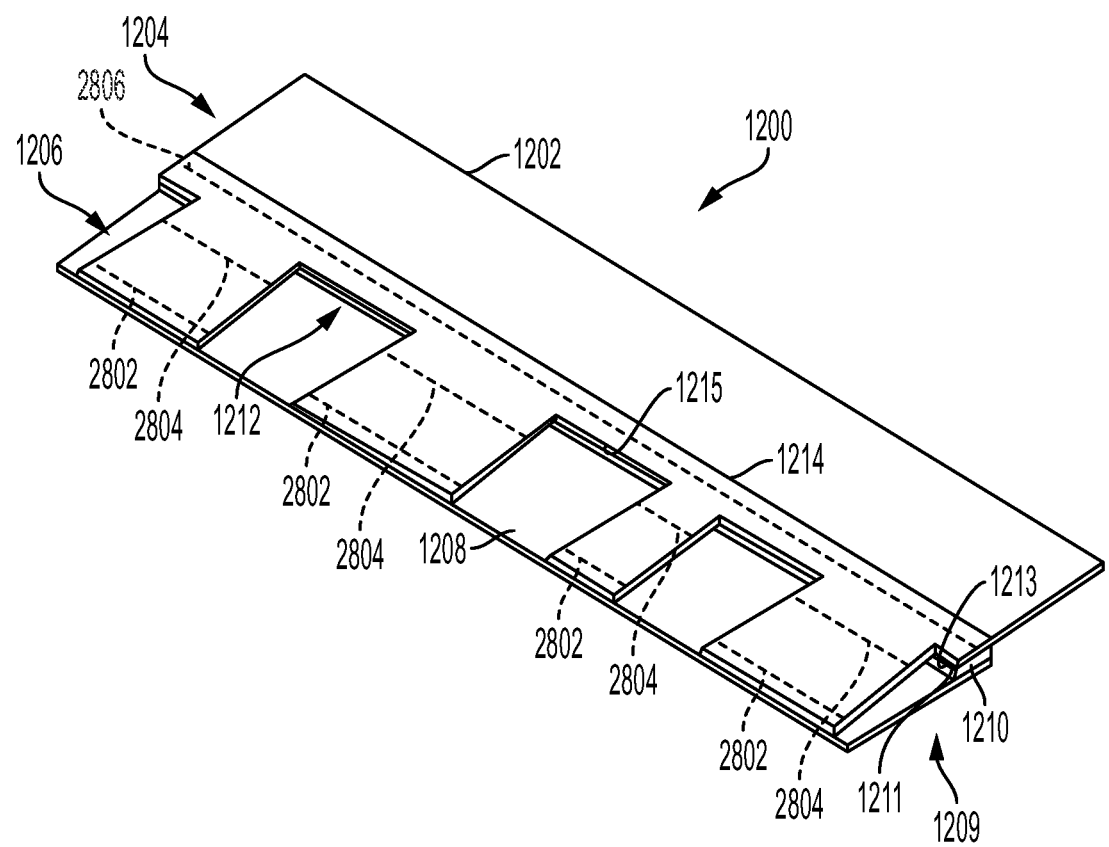
FIG. 28 shows a perspective view of exemplary laminated shingle having a deposited height increasing material.

Referring now to FIG. 23, exemplary laminated shingles 1000 are shown having an intermediate folded layer 1010. The shingles 1000 have an overlay layer 1002 attached to an underlay layer 1008 using an adhesive or any other suitable attachment means, which may or may not extend the full height of the overlay layer 1002. The overlay layer 1002 has a headlap portion 1004, and a tab portion 1006 having a plurality of tabs. The underlay layer 1008 includes a first folded portion 1010, an unfolded portion 1012, and a second folded portion 1014. The first folded portion 1010 can be connected to the first unfolded portion 1012 by a tape or scrim. The tape or scrim prevents the first folded portion 1010 from disconnecting from the first unfolded portion 1012 when folded. The second folded portion 1014 can be connected to the first unfolded portion 1012 by a tape or scrim. The tape or scrim prevents the second folded portion 1014 from disconnecting from the first unfolded portion 1012 when folded.

The shingle 1000 may optionally include an alignment guide 1020 to assist in aligning adjacent courses of shingles. In one exemplary embodiment, the first folded portion 1010 extends to the alignment guide. The overlay sheet 1002 may optionally include a nail zone (not shown) that may optionally be reinforced with reinforcement tape or any other material suitable for improving the strength of the shingle to resist nail pull through. In one exemplary embodiment, the first folded portion 1010 extends completely or partially beneath the nail zone. In one exemplary embodiment, the first folded portion 1010 and/or the second folded portion 1014 can be between 0.5 and 2.0 inches wide in one exemplary embodiment.

The first folded portion 1010 is folded so that the first folded portion 1010 is arranged between the overlay layer 1002 and the unfolded portion 1012 of the underlay layer 1002, thus forming an additional layer of material, or intermediate layer, between the overlay layer 1002 and underlay layer 1008. The first folded portion 1010 extends from the fold to the tab cutouts of the tab portion 1006. In certain embodiments, the first folded portion 1010 extends under the entirety of the tab portion 1006, like the intermediate layer 810 of shingle 800 as shown in FIG. 20. The second folded portion 1014 is folded so that the second folded portion 1014 is arranged under the unfolded portion 1012 of the underlay layer 1008. The second folded portion 1014 extends from a fold at the bottom edge of the shingle 1000 underneath the unfolded portion 1012. The first and second folded portions 1010, 1014 are folded during manufacturing before the overlay and underlay layers 1002, 1008 are joined together. The first and second folded portions 1010, 1014 may be about 5 percent to about 50 percent, or about 10 percent to about 40 percent, or about 20 percent to about 30 percent of the length of the unfolded portion 1012 of the underlay layer 1008. The first and second folded portions 1010, 1014 may be the same length, or may be different lengths. In certain embodiments, the second folded portion 1014 extends under the entirety of the unfolded portion 1012. Adhesive can optionally attach the first and second folded portions 1010, 1014 to the unfolded portion 1012. The first and second folded portions 1010, 1014 increase the thickness of the shingle 1000 to create a first thickened portion 1016 at the top of the openings between tabs of the tabbed portion 1006 and a second thickened portion 1018 along the bottom edge of the shingle 1000.

Referring now to FIGS. 24-27, an exemplary folding shingle 1100 for use on a roof hip or ridge is shown. A rear or back surface 1102 is shown facing upwards in FIG. 24 with the shingle 1100 in an unfolded condition, and a front or exposed surface 1108 is revealed in FIGS. 25-27 as the shingle 1100 is folded into a folded and/or installed condition shown in FIG. 27. The shingle 1100 has a folded portion 1101 and a main body or unfolded portion 1103 and is foldable along a folding line 1104. The folded portion 1101 of the shingle may be about 5 percent to about 50 percent, or about 10 percent to about 40 percent, or about 20 percent to about 30 percent of the length of the unfolded portion 1103 of the shingle 1100.

The shingle 1100 extends from a bottom edge 1105 to a top edge 1107. The shingle 1100 may be attached to the roof 100 by any suitable means, such as, for example, adhesive, nails, screws, staples, sealant, or other fastening devices. In some embodiments, a nail zone 1106 on the rear surface of the folded portion 1101 reinforces the material of the shingle to prohibit pull-through of nails used to secure the shingle 1100 to the roof. The nail zone 1106 may optionally be reinforced with reinforcement tape or any other material suitable for improving the strength of the shingle to resist nail pull through. The exposed surface 1108 optionally includes an adhesive portion 1110 arrange near or proximate the top edge 1107 for adhering to shingles of an adjacent higher course after the shingle 1100 is installed and folded.

The shingle 1100 is secured to the roof with nails hammered through the nail zone 1106 of the folded portion 1101. The unfolded portion 1103 is then lifted upward and folded back along the fold line 1104 until the unfolded portion 1103 contacts the folded portion 1101. Additional nails may then optionally be used to secure the unfolded portion 1103 to the roof in an optional nail zone (not shown). A shingle for the next course can then be installed on top of the shingle 1100 in the same way. The shingle 1100 may optionally include an alignment line on the exposed surface 1108 of the unfolded portion 1103 to aid in aligning the next course of shingles.

In the example illustrated by FIGS. 24-27, reinforcing material 1114 is applied to the folding line 1104 to maintain the connection between the folded and unfolded portions 1101, 1103 in case the shingle material breaks along the folding line 1104 after folding or during the life of the shingle. An adhesive portion 1116 is provided on the folded portion 1101 of the shingle 1100 to secure the folded and unfolded portions 1101, 1103 together after folding the shingle. The adhesive portion 1116 could be provided on the unfolded portion 1103 on the opposite side of the reinforcing material 1114, instead of or in addition to the adhesive portion 1116 on the folded portion 1101. The adhesive portion 1116 melts and join the portions 1101, 1103 together as the installed shingle 1100 heats up from exposure to the light of the sun. In certain embodiments, the adhesive portion 1116 is applied to the unfolded portion 1103 or may be applied to both folded and unfolded portions 1101, 1103. The reinforcing material 1114 and/or an adhesive portion 1116 can be applied to any of folded portions of the laminated shingles described above.

Referring now to FIGS. 28 and 29A-29D, a further exemplary laminated shingle 1200 with a thicker appearance is shown. The exemplary shingle 1200 of FIGS. 28 and 29A-29D includes a deposited height increasing material

1209. The deposited height increasing material 1209 may take a wide variety of different forms. Any material that can be sprayed, extruded, coated, rolled or otherwise dispensed onto the underlay and/or overlay layers 1202, 1208 can be used. One, two, three or any number of materials can be deposited to form the height increasing layer 1209. Examples of deposited height increasing layers include, but are not limited to, asphalt, including filled and unfilled asphalt, ceramic coated roofing granules, crushed rock (i.e., small granule-sized rocks), crushed rock that is not ceramic coated, sealants and adhesives, such as asphalt based sealants and adhesives and non-asphalt based sealants and adhesives, sand, hot melt plastic, etc. and any combination of these materials. In one exemplary embodiment, the material(s) used to make the deposited height increasing layer 1209 are material(s) that are used in construction of the other portions of the shingle (i.e., the material(s) is already used in an otherwise identical shingle that does not include the deposited height increasing layer 1209). For example, the deposited layer 1209 may include one or more of roofing granules, asphalt coating, backing sand, fiberglass mat, and sealant or adhesive (used to secure layers of the laminated shingle together) that are used in other portions of the laminated shingle 1200.

The shingle 1200 is shown in a perspective view and with side views shown of the shingle in various stages of construction (e.g., FIGS. 29A-29D). When shown in the side view, the layers are shown in the abstract where the tab portions are spaced apart from the underlay layer, though these layers would bend to contact each other when the shingles are made, and a gap may or may not exist along the entire length of the tabs.

An exemplary laminated shingle 1200 is shown in FIGS. 28 and 29A-29D having a deposited height increasing material 1209 that comprises an intermediate adhesive layer 1210 and intermediate granule coating 1211. The shingles have an overlay layer 1202 attached to an underlay layer 1208 using an adhesive or sealant or any other suitable attachment means, which may or may not extend the full height of the overlay layer 1202. For example, laminating adhesive may be provided between the layers 1202, 1208 at one or more of regions 2802, 2804, 2806. Also, the deposited height increasing material 1209 can be applied at other areas between the layers 1202, 1208, such as area 2802. The overlay layer 1202 has a headlap portion 1204, and a tab portion 1206 having a plurality of tabs. A deposited height increasing material 1209, such as the illustrated intermediate adhesive layer 1210 and an intermediate granule coating 1211, is provided between the overlay and underlay layers 1202, 1208. The deposited height increasing material 1209 is arranged between the headlap portion 1204 of the overlay layer 1202 and the underlay layer 1208 and does not substantially extend under the tab portion 1206. In the illustrated example, a front edge 1213 of the deposited height increasing material 1209 is aligned with or substantially aligned with a cutout edge 1215 of the overlay layer 1202.

In the illustrated embodiment, the intermediate adhesive layer 1210 is disposed on an upper surface of the underlay layer 1208. The intermediate granule coating 1211 is disposed between the intermediate adhesive layer 1210 and the overlay layer 1202. As can be seen in FIGS. 29C and 29D, an adhesive 1216 attaches the intermediate granule coating 1211 and overlay layer 1202, thereby securing the layers 1202, 1208 of the shingle 1200 together. However, the layers can be flipped with the layer 1210 on the overlay layer 1202 and the adhesive 1216 on the underlay layer 1208.

Turning to FIGS. 29A-29D, a process of forming the exemplary shingle 1200 is depicted. The height increasing deposited material 1209 is deposited on the underlay layer 1206. For example, the intermediate adhesive layer 1210 can be deposited onto a top surface of the underlay layer 1208 along an upper edge of the underlay layer 1206 for the full width of the shingle 1200. However, in other embodiments, the adhesive 1210 can be applied to the bottom of the overlay layer 1202. As such, the intermediate adhesive layer 1210 extends the entire width of the headlap portion 1204 of the overlay layer 1202. The intermediate adhesive layer 1210 may be any adhesive known in the art. Preferably, the intermediate adhesive layer 1210 is extrusion coated onto the outer edge of the underlay layer 1208. In an additional preferred embodiment, the intermediate adhesive layer 1210 is extrusion coated to a width between about 0.5 and 2.0 inches, such as between about 0.75 and 1.5 inches, such as about 1.0 inch. In a further preferred embodiment, the intermediate adhesive layer 1210 is extruded to a height between about 0.010 and 0.050 inches, such as between about 0.020 and 0.040 inches, such as about 0.030 inches. In this example, providing a height increasing material 1209 at area 2802 provides the front edge of the tab portion 1206 with a thicker appearance. The deposited height increasing material 1209 can be deposited at the area 2806 and area 2802, at the area 2806 but not the area 2802, and the material 1209 can be applied at the area 2802 but not the area 2806. In one exemplary embodiment, the height increasing material 1209 is applied in the area 2802 to increase the height of the front edges of the tabs, in the are 2806 to increase the height of the cutout edge 1215, and in the area 2804 (and optionally additional areas between the areas 2802, 2806) to provide a consistent thickness to the tabs.

Figure 29A:
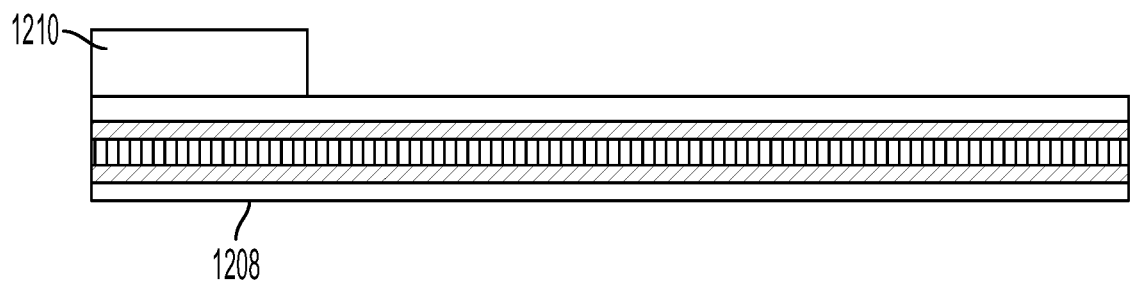
Figure 29B:
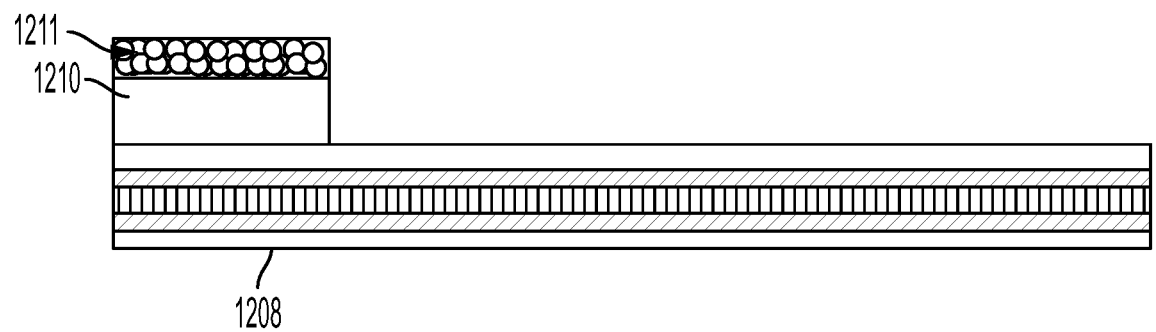

Granules are subsequently applied onto the intermediate adhesive layer 1210 to form the intermediate granule coating 1211 (FIG. 29B). The granules 1211 may optionally be pressed into the adhesive layer 1210, such that the granules become embedded in the adhesive layer 1210. The granules may be the same type of roofing granules used at other parts of the shingle 1200. For example, the granules may be the same type of granule used in the headlap portion of the shingle 1200.

An adhesive 1216 is disposed on top of the intermediate granule coating 1211 (FIG. 29C) or may be applied to the overlay layer 1202, such that the adhesive 1216 becomes disposed on the granule coating 1211 when the underlay layer 1280 is assembled to the overlay layer 1202. The adhesive 1216 may be any adhesive or any other suitable attachment means. The adhesives and/or adhesives 1210, 1216 may be the same material. In one exemplary embodiment, the adhesives 1216 are the same materials used to laminate the layers 1202, 1208 of the shingle 1200 together at other locations of the shingle 1200. The overlay layer 1202 is then attached to the adhesive 1216 (FIG. 29D) to form the shingle 1200. The overlay layer 1202 may be laminated to the remainder of the shingle 1200 in the conventional fashion with lines of adhesive or sealant. The deposited height increasing material 1209, formed of the intermediate adhesive layer 1210 and intermediate granule coating 1211, under the headlap portion 1202 increase the thickness of the shingle 1200 to create a thickened portion 1212 at the top of the gaps between tabs of the tabbed portion 1206.

The shingle 1200 may optionally include an alignment guide 1214 to assist in aligning adjacent courses of shingles. In one exemplary embodiment, the intermediate adhesive layer 1210 and intermediate granule coating 1211 can extend to the alignment guide 1214. The overlay sheet 1202 may optionally include a nail zone (not shown) that may optionally be reinforced with reinforcement tape or any other material suitable for improving the strength of the shingle to resist nail pull through. In one exemplary embodiment, the intermediate layer can extend under all or a portion of the nail zone.

Figure 30:
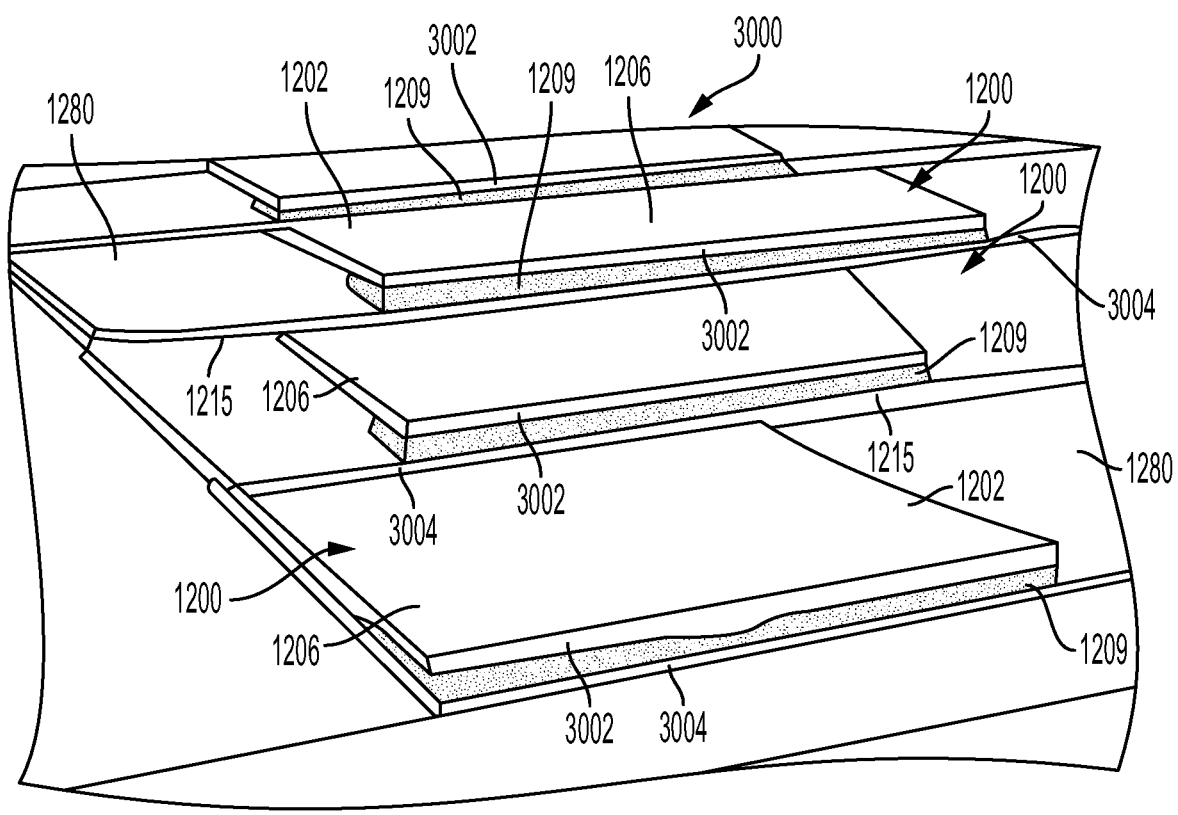
FIG. 30 illustrates a portion of a roof with shingles having a height increasing material disposed along front edges of tab portions of the shingles.

FIG. 30 illustrates an exemplary embodiment of a roof 3000 having shingles 1200 with height increasing material 1209. In the illustrated example, the height increasing material 1209 is applied between the overlay 1202 and the underlay 1280 near the front edges 3002 of the tab portions 1206 and the front edge 3004 of the underlay 1280. This configuration provides the front edges 3002 of the tab portions 1206 it a thicker or raised appearance. In other exemplary embodiments, the height increasing material can be provided between the overlay 1202 and the underlay 1280 near the cutout edge 1215. In other exemplary embodiments, the height increasing material can be provided between the overlay 1202 and the underlay 1280 both near the front edges 3002 and near the cutout edge 1215.

Figure 31:
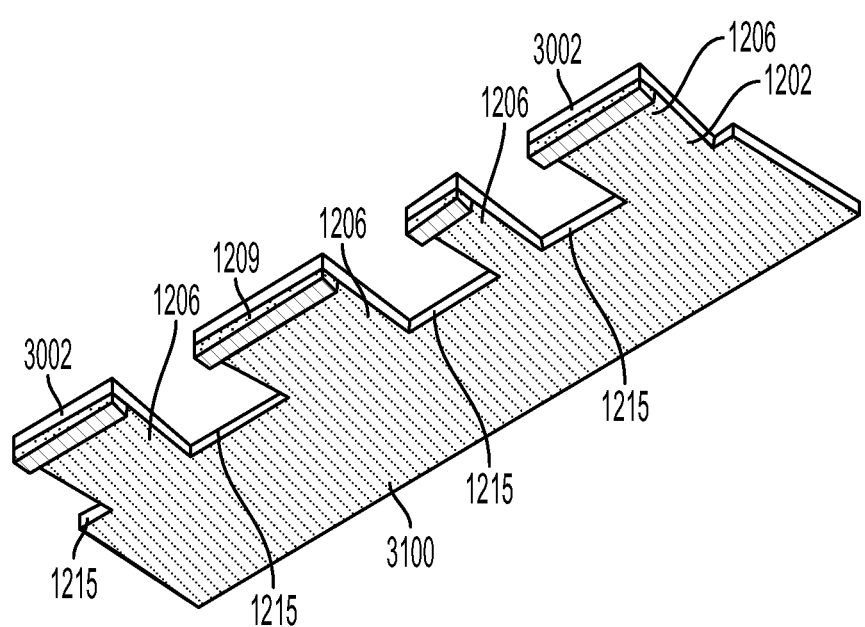
FIG. 31 illustrates an exemplary embodiment of an overlay of a shingle having a height increasing material applied to rear surface of the overlay.
Figure 32:
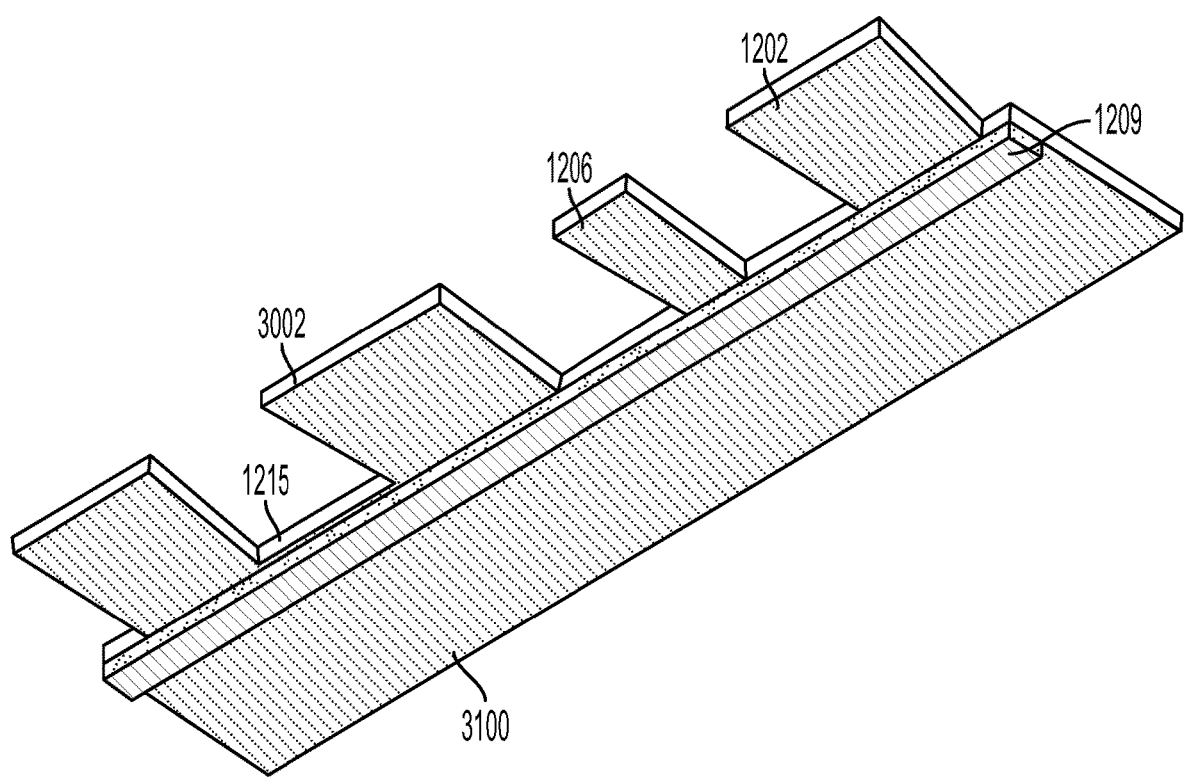
FIG. 32 illustrates an exemplary embodiment of an overlay of a shingle having a height increasing material applied to rear surface of the overlay.
Figure 33:
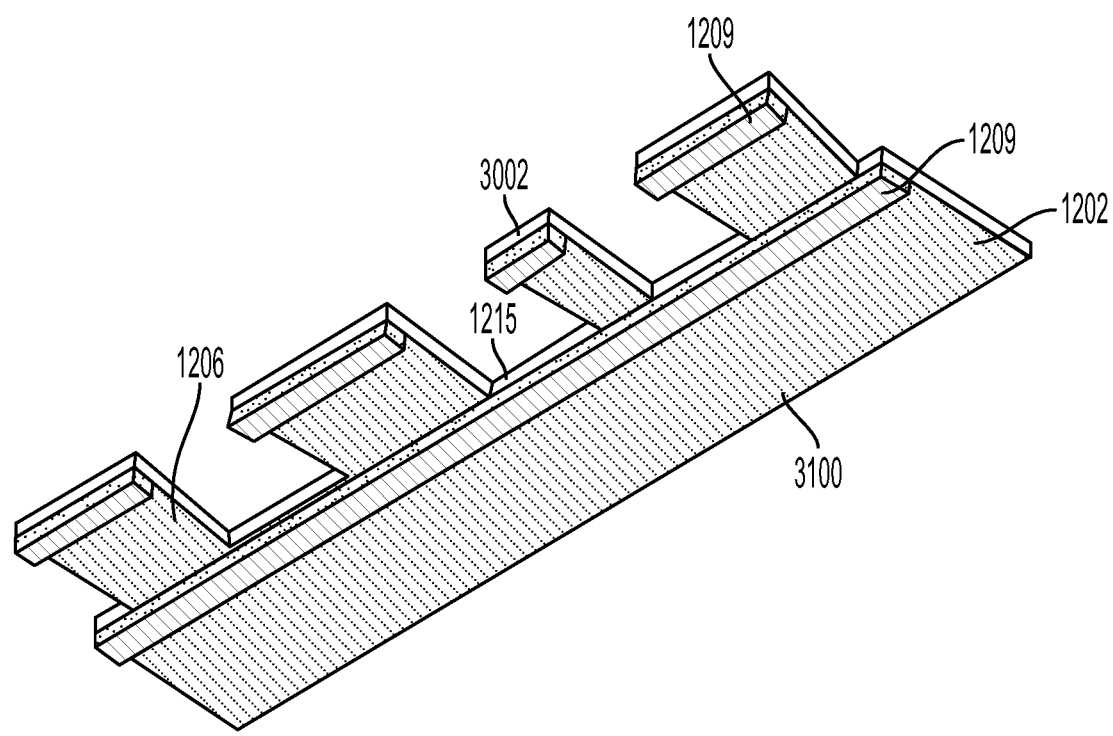
FIG. 33 illustrates an exemplary embodiment of an overlay of a shingle having a height increasing material applied to rear surface of the overlay.
Figure 34:
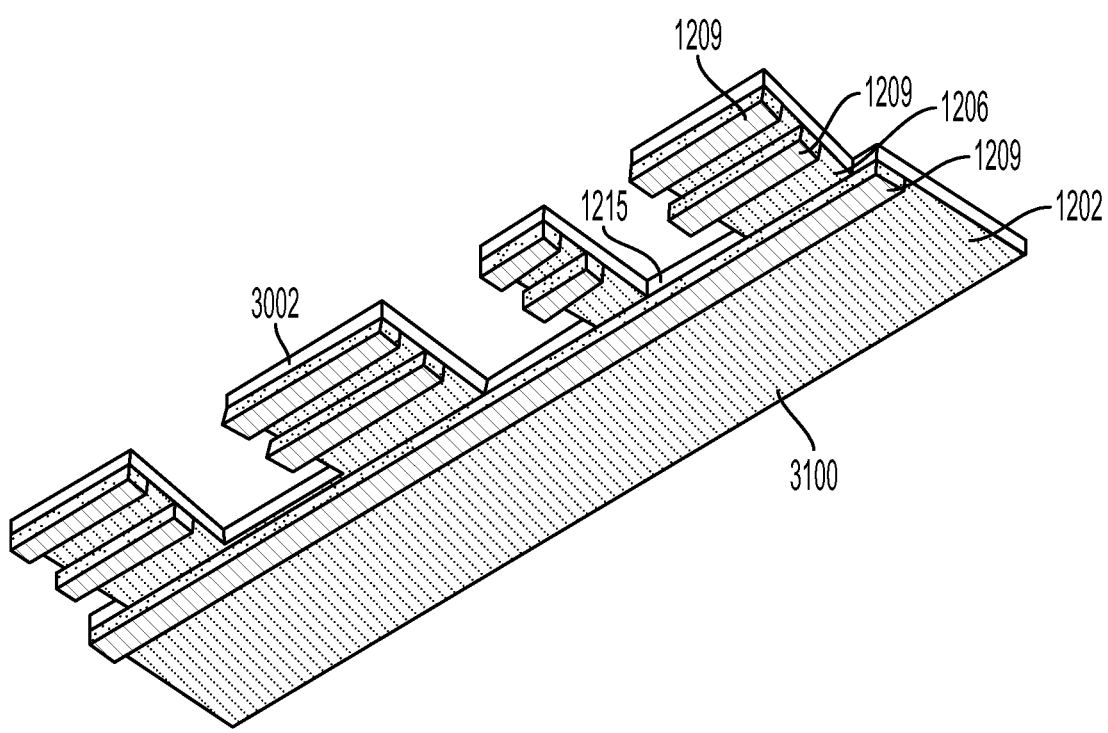
FIG. 34 illustrates an exemplary embodiment of an overlay of a shingle having a height increasing material applied to rear surface of the overlay.

As noted above, the height increasing material 1209 can be applied to the overlay 1202 and/or the underlay 1280. In the example illustrated by FIG. 31, the height increasing material 1209 is applied to the bottom surface 3100 of the overlay 1202 at or near the front edges 3002 of the tab portions 1206 before the overlay 1202 is laminated to the underlay 1280. In the example illustrated by FIG. 32, the height increasing material 1209 is applied to the bottom surface 3100 of the overlay 1202 at or near the cutout edge 1215 before the overlay 1202 is laminated to the underlay 1280. In the example illustrated by FIG. 33, the height increasing material 1209 is applied to the bottom surface 3100 of the overlay 1202 at or near the front edges 3002 of the tab portions 1206 and near the cutout edge 1215 before the overlay 1202 is laminated to the underlay 1280. In the example illustrated by FIG. 34, the height increasing material 1209 is applied to the bottom surface 3100 of the overlay 1202 at or near the front edges 3002 of the tab portions 1206, near the cutout edge 1215, and between the front edges 3002 and the cutout edge 1215 before the overlay 1202 is laminated to the underlay 1280.

Figure 35:
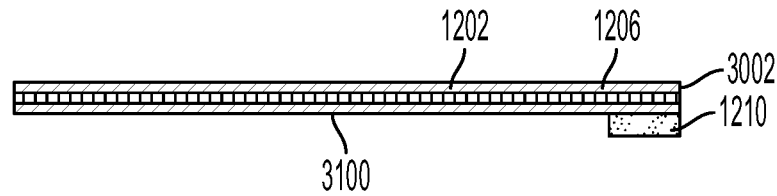
FIGS. 35-39 illustrate an exemplary embodiment of manufacturing stages of a shingle having an overlay, and underlay, and a height increasing material between the overlay and the underlay.

FIGS. 35-39 illustrate an exemplary embodiment of a method for making a shingle where a height increasing material 1209 is deposited on the bottom surface 3100 of the underlay layer 1206 near the front edges 3002 of the tab portions 1206. Referring to FIG. 35, the intermediate adhesive layer 1210 can be deposited onto the bottom surface 3100 of the underlay layer 1206 near the front edges 3002 of the tab portions 1206. As such, the intermediate adhesive layer 1210 extends only along the widths of the front edges of the tab portions 1206 (See FIG. 31). The intermediate adhesive layer 1210 may be any adhesive known in the art. The intermediate adhesive layer 1210 can be roll coated onto a tab portion 1206 by a roller (not shown) that applies the adhesive to the tab portion whenever the tab portion is in contact with the roller. The intermediate adhesive layer 1210 can be coated to a width between about 0.5 and 2.0 inches, such as between about 0.75 and 1.5 inches, such as about 1.0 inch. The intermediate adhesive layer 1210 can be applied to a height between about 0.010 and 0.050 inches, such as between about 0.020 and 0.040 inches, such as about 0.030 inches.

Figure 36:
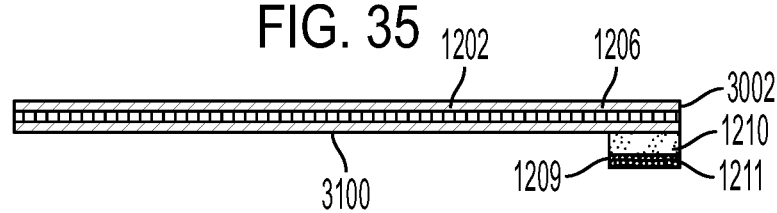

Referring to FIG. 36, granules 1211 are subsequently applied onto the intermediate adhesive layer 1210 to form the intermediate granule coating 1211. The granules 1211 may optionally be pressed into the adhesive layer 1210, such that the granules become embedded in the adhesive layer 1210. The granules may be the same type of roofing granules used at other parts of the shingle 1200. For example, the granules may be the same type of granule used in the headlap portion of the shingle 1200.

Figure 37:
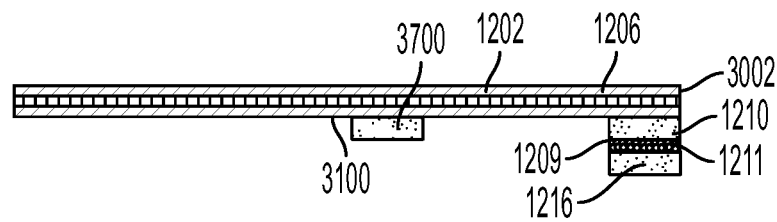

Referring to FIG. 37, a first laminating adhesive 1216 is applied on the intermediate granule coating 1211 and a second laminating adhesive 3700 is applied where an upper end 3800 of the underlay layer 1280 will be bonded to the overlay layer 1202. The second laminating 3700 adhesive can take a wide variety of different forms. The second laminating adhesive 3700 can be the same material as the first laminating adhesive 1216 or a different material than the first laminating adhesive. The second laminating adhesive 3700 and the first laminating adhesive 126 can optionally be any of the materials that the intermediate adhesive layer 1210 is made from. The intermediate adhesive 1210 can be the same material as the first laminating adhesive 1216 or a different material than the first laminating adhesive.

Figure 38:
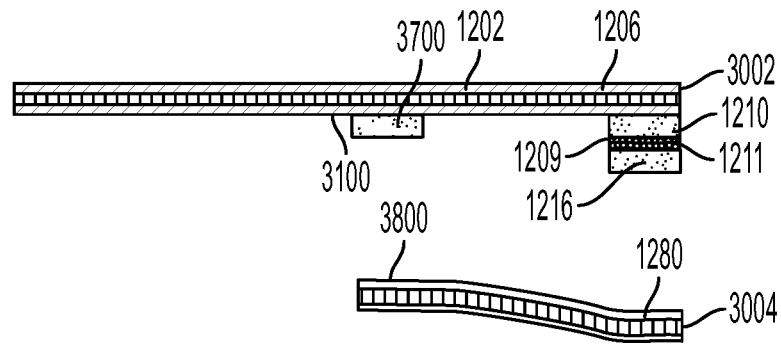
Figure 39:
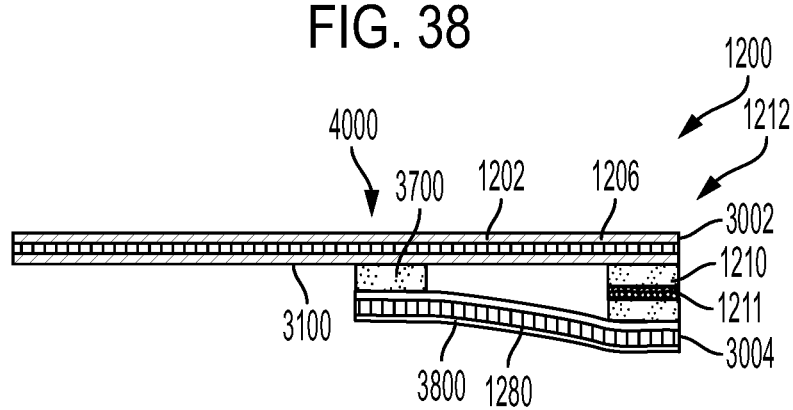
Figure 40:
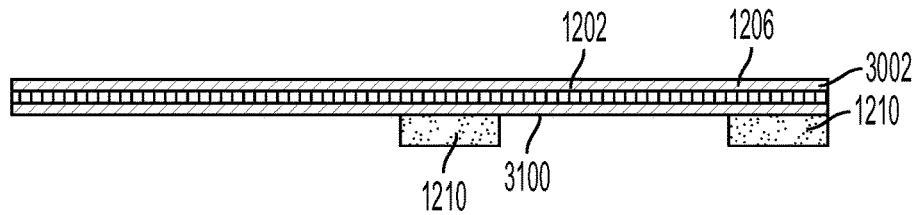
FIGS. 40-44 illustrate an exemplary embodiment of manufacturing stages of a shingle having an overlay, and underlay, and a height increasing material between the overlay and the underlay.

Referring to FIGS. 38 and 39, the underlay layer 1280 is then attached to the overlay layer 1202 by the adhesives 1216, 3700 to form the laminated shingle 1200. The overlay layer 1202 may be laminated to the underlay layer 1280 in the conventional fashion with adhesives 1216, 3700 and additional lines of adhesive or sealant. The deposited height increasing material 1209, formed of the intermediate adhesive layer 1210 and intermediate granule coating 1211, under the headlap layer 1202 increase the thickness of the shingle 1200 to create a thickened portion 1212 at the front edges 3002 of the tab portions 1206. This gives the roof the appearance illustrated by FIG. 30.

FIGS. 40-44 illustrate an exemplary embodiment of a method for making a shingle where a height increasing material 1209 is deposited on the bottom surface 3100 of the underlay layer 1206 near the front edges 3002 of the tab portions 1206 and near the cutout edge 1215 of the overlay 1202. The intermediate adhesive layer 1210 near the front edges 3002 extends only along the widths of the front edges of the tab portions 1206 and the intermediate adhesive layer 1210 near the cutout edges extends the entire width of the shingle 1200 (See FIG. 33). The intermediate adhesive layers 1210 may be any adhesive known in the art. The intermediate adhesive layers 1210 can be roll coated onto a tab portion 1206 and a common bond area 4000 by one or more rollers (not shown). The one or more rollers can apply the adhesive to the tab portion whenever the tab portion is in contact with the roller and can continuously apply an intermediate adhesive layer to the common bond area 4000. The intermediate adhesive layers 1210 can be coated to a width between about 0.5 and 2.0 inches, such as between about 0.75 and 1.5 inches, such as about 1.0 inch. The two illustrated intermediate adhesive layers can have the same width or different widths. The intermediate adhesive layer 1210 can be applied to a height between about 0.010 and 0.050 inches, such as between about 0.020 and 0.040 inches, such as about 0.030 inches. The two illustrated intermediate adhesive layers can have the same height or different heights.

Figure 41:
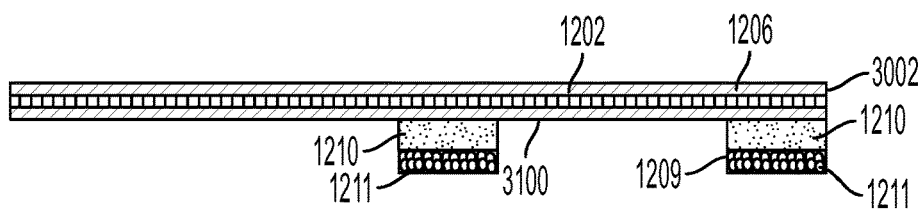

Referring to FIG. 41, granules 1211 are subsequently applied onto the intermediate adhesive layers 1210 to form the intermediate granule coatings 1211. The granules 1211 may optionally be pressed into the adhesive layers 1210, such that the granules become embedded in the adhesive layers 1210. The granules may be the same type of roofing granules used at other parts of the shingle 1200. For example, the granules may be the same type of granule used in the headlap portion of the shingle 1200.

Figure 42:
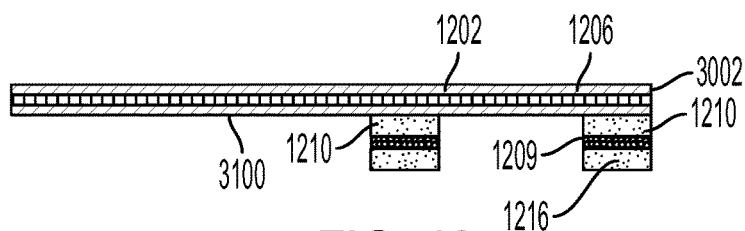
Figure 43:
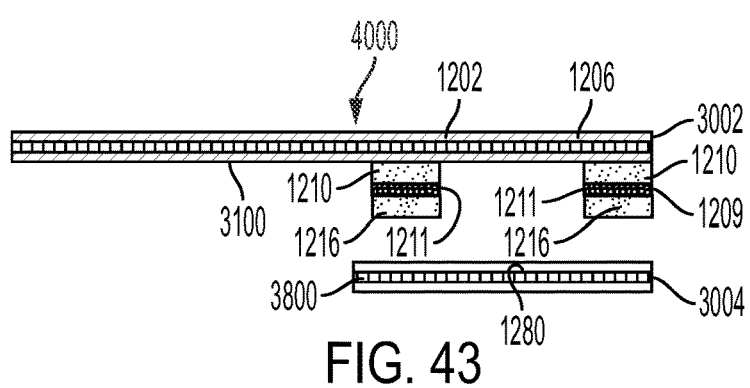
Figure 44:
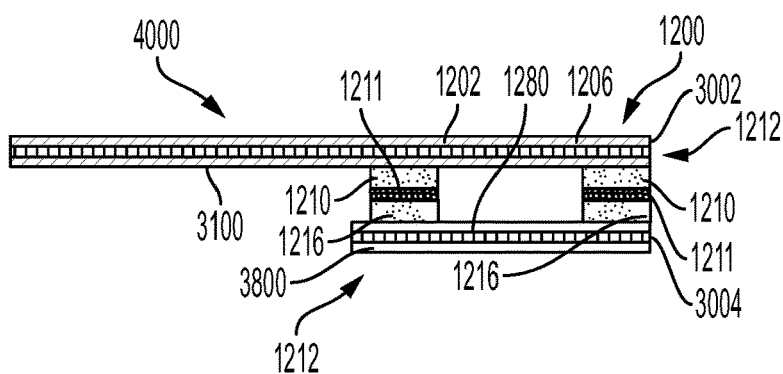
Figure 45:
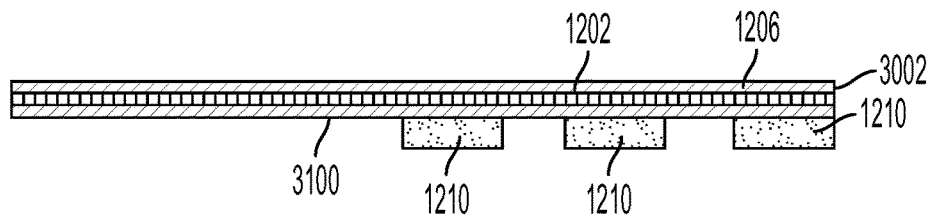
FIGS. 45-49 illustrate an exemplary embodiment of manufacturing stages of a shingle having an overlay, and underlay, and a height increasing material between the overlay and the underlay.

Referring to FIG. 42, laminating adhesives 1216 are applied on the intermediate granule coatings 1211. Referring to FIGS. 43 and 44, the underlay layer 1280 is then attached to the overlay layer 1202 by the adhesives 1216 to form the laminated shingle 1200. The overlay layer 1202 may be laminated to the underlay layer 1280 in the conventional fashion with the adhesives 1216. The deposited height increasing material 1209, formed of the intermediate adhesive layer 1210 and intermediate granule coating 1211, under the headlap layer 1202 increase the thickness of the shingle 1200 to create a thickened portion 1212 at the front edges 3002 of the tab portions 1206 and at the cutout edge 1215.

FIGS. 45-49 illustrate an exemplary embodiment of a method for making a shingle where a height increasing material 1209 is deposited on the bottom surface 3100 of the underlay layer 1206 near the front edges 3002 of the tab portions 1206, near the cutout edge 1215 of the overlay 1202, and between the front edges 3002 and the cutout edge. The intermediate adhesive layer 1210 near the front edges 3002 extends only along the widths of the front edges of the tab portions 1206. The intermediate adhesive layer 1210 near the cutout edges 1215 extends the entire width of the shingle 1200 (See FIG. 34). The intermediate adhesive layer 1210 between the front edges 3002 and the cutout edges 1215 extends only along the widths of the tab portions 1206. The intermediate adhesive layers 1210 may be any adhesive known in the art. The intermediate adhesive layers 1210 can be roll coated onto a tab portion 1206 and the common bond area 4000 by one or more rollers (not shown). The one or more rollers can apply the adhesive to the tab portion whenever the tab portion is in contact with the roller and can continuously apply an intermediate adhesive layer to the common bond area. The intermediate adhesive layers 1210 can be coated to a width between about 0.5 and 2.0 inches, such as between about 0.75 and 1.5 inches, such as about 1.0 inch. The three illustrated intermediate adhesive layers can have the same width or different widths. The intermediate adhesive layer 1210 can be applied to a height between about 0.010 and 0.050 inches, such as between about 0.020 and 0.040 inches, such as about 0.030 inches. The three illustrated intermediate adhesive layers can have the same height or different heights.

Figure 46:
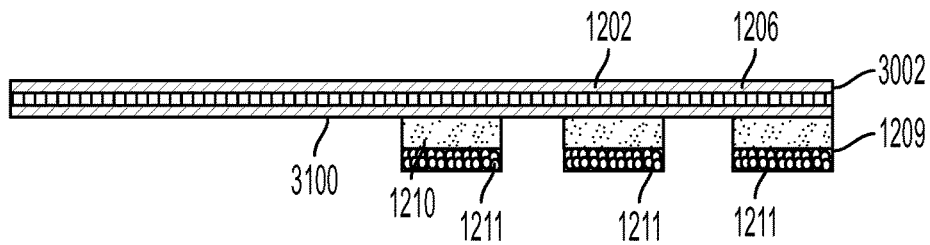

Referring to FIG. 46, granules are subsequently applied onto the intermediate adhesive layers 1210 to form the intermediate granule coatings 1211. The granules 1211 may optionally be pressed into the adhesive layers 1210, such that the granules become embedded in the adhesive layers 1210. The granules may be the same type of roofing granules used at other parts of the shingle 1200. For example, the granules may be the same type of granule used in the headlap portion of the shingle 1200.

Figure 47:
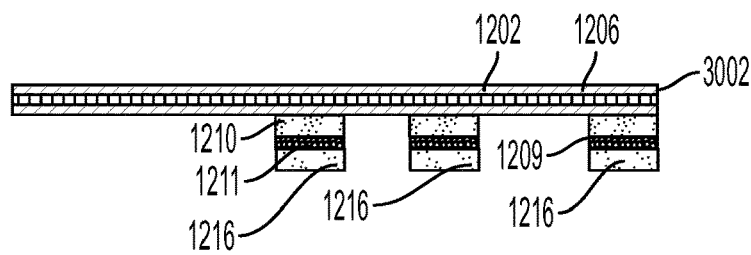

Referring to FIG. 47, laminating adhesives 1216 are applied on the intermediate granule coatings 1211. The intermediate adhesive 1210 can be the same material as the laminating adhesive 1216 or a different material than the laminating adhesive 1216.

Figure 48:
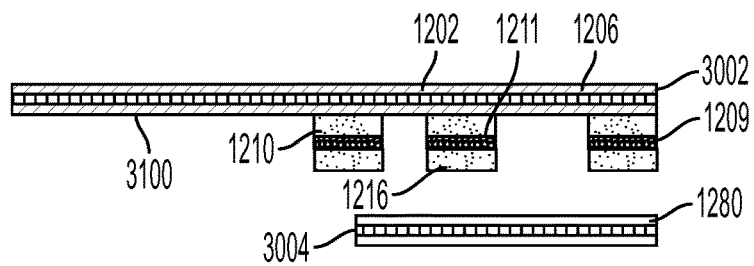
Figure 49:
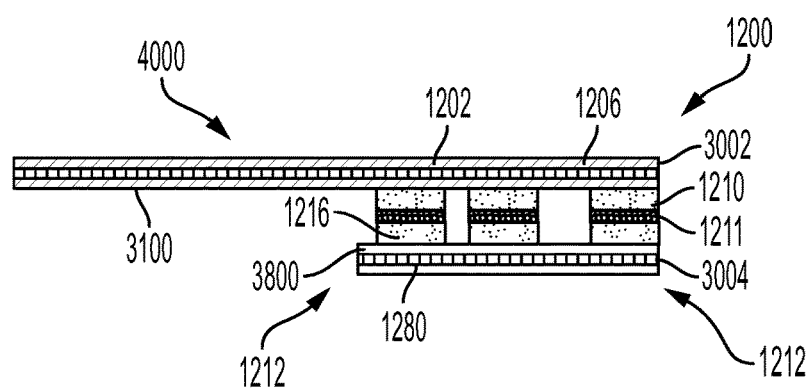

Referring to FIGS. 48 and 49, the underlay layer 1280 is then attached to the overlay layer 1202 by the adhesives 1216 to form the laminated shingle 1200. The overlay layer 1202 may be laminated to the underlay layer 1280 in the conventional fashion with the adhesives 1216. The deposited height increasing material 1209, formed of the intermediate adhesive layer 1210 and intermediate granule coating 1211, under the headlap layer 1202 increase the thickness of the shingle 1200 to create a thickened portion 1212 at the front edges 3002 of the tab portions 1206 and at the cutout edge 1215. A wide variety of different shingle configurations can be made in the general manner illustrated by the examples of FIGS. 28-49.

Figure 50:
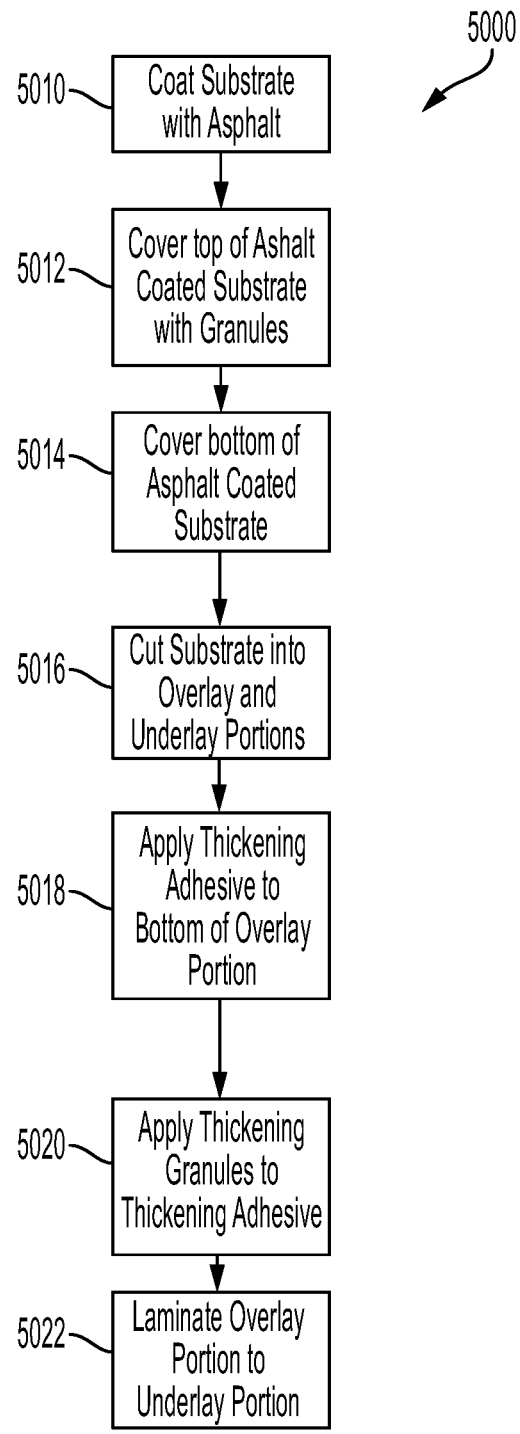
FIG. 50 is a flowchart that illustrates an exemplary embodiment of a method of making shingles with a thickened portion.

FIG. 50 is a flowchart that illustrates an exemplary embodiment of a method 5000 of making shingles 1200 with thickened portions 1209. In the method, a substrate is coated 5010 with asphalt. The substrate can be coated with asphalt on the front and/or the back. The top of the asphalt coated substrate is covered 5012 with granules. The bottom of the asphalt coated substrate is covered 5014. For example, the bottom of the asphalt coated substrate can be covered with sand, crushed rock, plastic, a stearate, a polymer, including, but not limited to polypropylene, or any other material that can keep stacked shingles from sticking together. The substrate is cut 5016 into overlay and underlay portions. A thickening adhesive is applied 5018 to the bottom of the overlay portion. Thickening granules are applied 5020 onto the thickening adhesive. The overlay portion is laminated 5022 to the underlay portion. The laminated overlay and underlay portions are cut into segments to form individual laminated shingles with thickened portions 1209.

Figure 51:
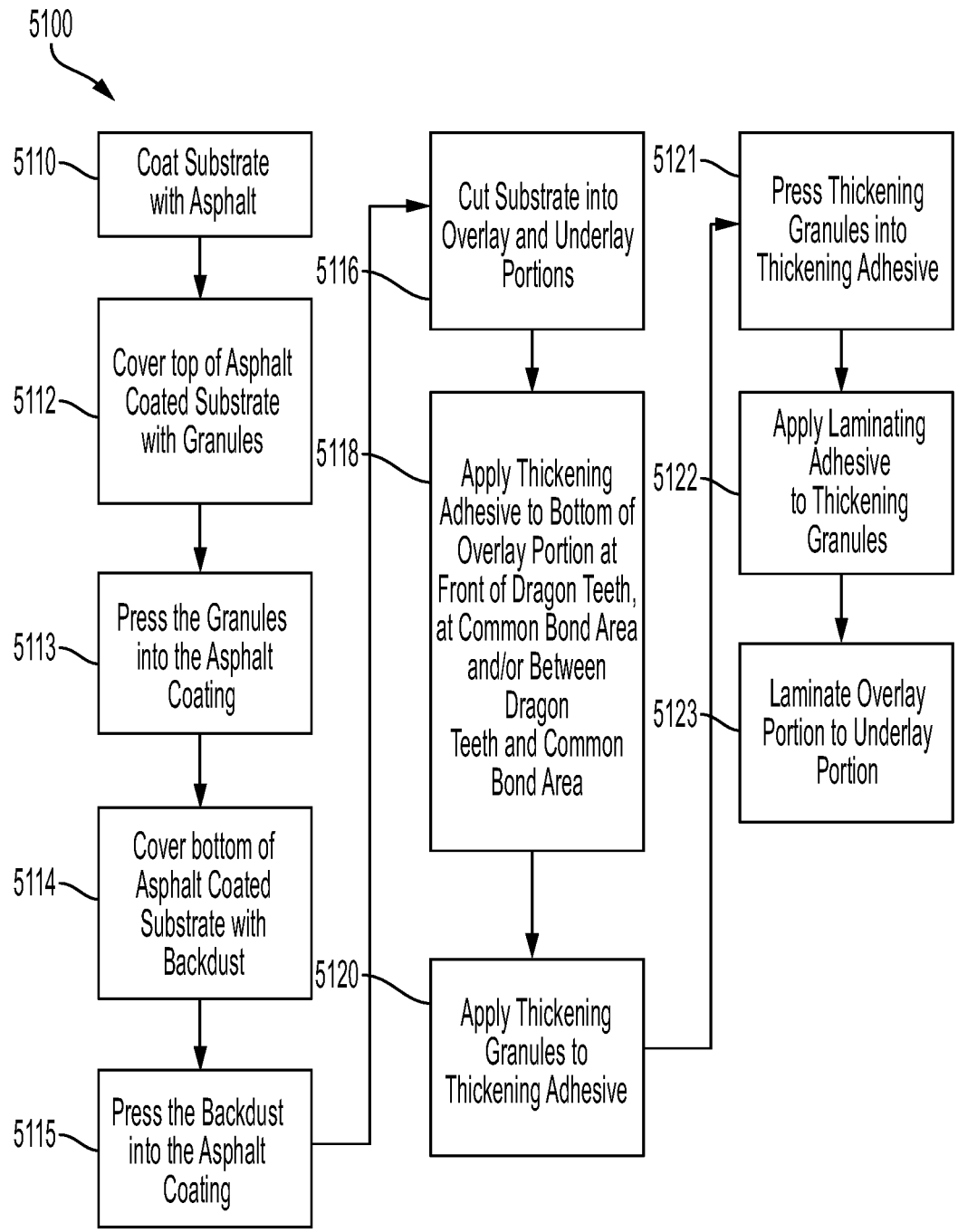
FIG. 51 is a flowchart that illustrates an exemplary embodiment of a method of making shingles with a thickened portion.
Figure 52:
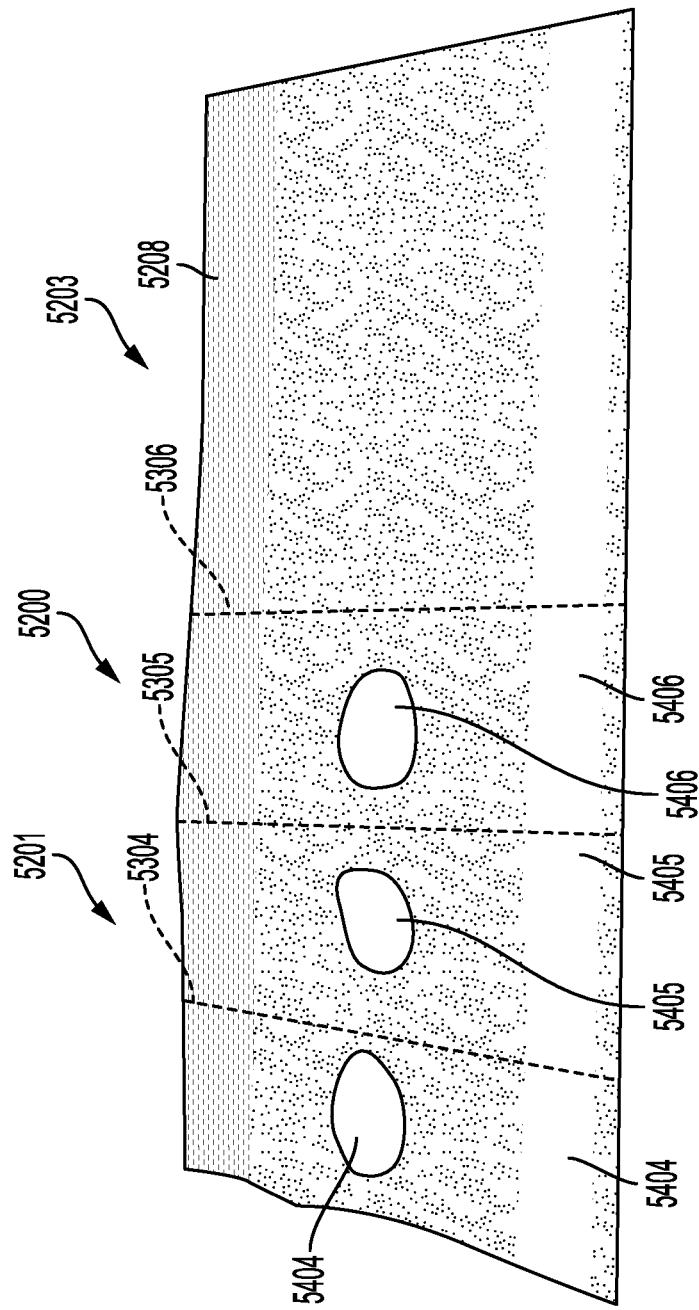
FIGS. 52-58 are perspective views of an exemplary hip and ridge shingle being folded from an unfolded to folded condition.

FIG. 51 is a flowchart that illustrates an exemplary embodiment of a method 5100 of making shingles 1200 with thickened portions 1209. In the method, a substrate is coated 5110 with asphalt. The substrate can be coated with asphalt on the front and/or the back. The top of the asphalt coated substrate is covered 5112 with granules. The granules are pressed 5113 into the asphalt coated substrate The bottom of the asphalt coated substrate is covered 5114. For example, the bottom of the asphalt coated substrate can be covered with sand, crushed rock, plastic, a stearate, a polymer, including, but not limited to polypropylene, or any other material that can keep stacked shingles from sticking together. When backdust, sand, crushed rock or other particulate material covers the bottom of the asphalt coated substrate, the particulate material is pressed 5115 into the asphalt coating. The substrate is cut 5116 into overlay and underlay portions. A thickening adhesive is applied 5118 to the bottom of the overlay portion. For example, the thickening adhesive can be applied to the bottom of the overlay portion at the front of the tabs or dragon teeth, at the common bond area, and/or between the fronts of the dragon teeth and the common bond area. Thickening granules are applied 5120 onto the thickening adhesive. The thickening granules are pressed 5121 are pressed into the thickening adhesive. Laminating adhesive is applied 5122 to the thickening granules. The overlay portion is laminated 5123 to the underlay portion. The laminated overlay and underlay portions are cut into segments to form individual laminated shingles with thickened portions 1209.

Referring now to FIGS. 52-58, an exemplary folding shingle 5200 for use on a roof hip or ridge is shown. A front surface 5208 is shown in FIGS. 52-56 and 58. A rear or back surface 5202 is shown facing upwards in FIG. 57. The shingle 5200 is shown in an unfolded condition in FIG. 52. The shingle 5200 has a folding portion 5201 and main body or unfolded portion 5203. The folding portion 5201 is foldable along lines 5304, 5305, 5306. The lines 5304, 5305, 5306 divide the folding portion 5201 into three segments 5404, 5405, 5406. The fold lines 5304, 5305, 5306 can take a wide variety of different forms that allow the segments 5404, 5405, 5406 to be folded along the lines 5304, 5305, 5306. For example, the shingle 5200 can be perforated or scored along the fold lines.

The fold lines 5304, 5305, 5306 can optionally be reinforced to prevent the shingle 5200 from tearing along the fold lines 5304, 5305, 5306. The reinforcement can be a reinforcing tape (See FIGS. 24-27). For example, a reinforcement tape can connect the segments 5404, 5405 together along the fold line 5304. This reinforcement tape can be provided on the top side of the shingle. A reinforcement tape can connect the segments 5405, 5406 together along the fold line 5305. This reinforcement tape can be provided on the bottom side of the shingle. A reinforcement tape can connect the segment 5406 to the main body or unfolded portion 5203 along the fold line 5306. This reinforcement tape can be provided on the bottom side of the shingle.

In the illustrated embodiment, the three segments 5404, 5405, 5406 include cutouts 5504, 5505, 5506 respectively. The cutouts 5504, 5505, 5506 can take a wide variety of different forms. In the illustrated example, the cutouts 5504, 5505, 5506 are circular in shape. However, in other embodiments, the cutouts 5404, 5505, 5506 can be ovals, rectangles, squares, diamonds, slits, etc. In the illustrated embodiment, each of the segments 5404, 5405, 5406 includes a single cutout 5504, 5505, 5506. However, in other embodiments the segments 5404, 5405, 5406 can have more than one cutout 5504, 5505, 5506 and the segments 5404, 5405, 5406 can have different numbers of cutouts. In the illustrated example, the cutouts 5504, 5505, 5506 are aligned when the segments 5404, 5405, 5406 are folded as shown in FIGS. 53-58. The cutouts 5504, 5505, 5506 allow the stacked folded segments 5404, 5405, 5406 to be bent over a hip or ridge of a roof. The shingle 5200 (as well as any of the shingles disclosed herein) can be made from a polymer modified asphalt to further enhance the ability of the stacked folded segments 5404, 5405, 5406 to be bent of the hip or ridge of a roof. A wide variety of different polymer modified asphalt compositions can be used to make the shingles disclosed herein. In one exemplary embodiment, the polymer modified asphalt used to make the shingles disclosed herein is a polymer modified asphalt composition disclosed by U.S. Provisional Patent Application Nos. 62/599,406 and 62/724,417, filed on Dec. 15, 2017 and Aug. 29, 2018 respectively, which are incorporated herein by reference in their entirety.

Figure 53:
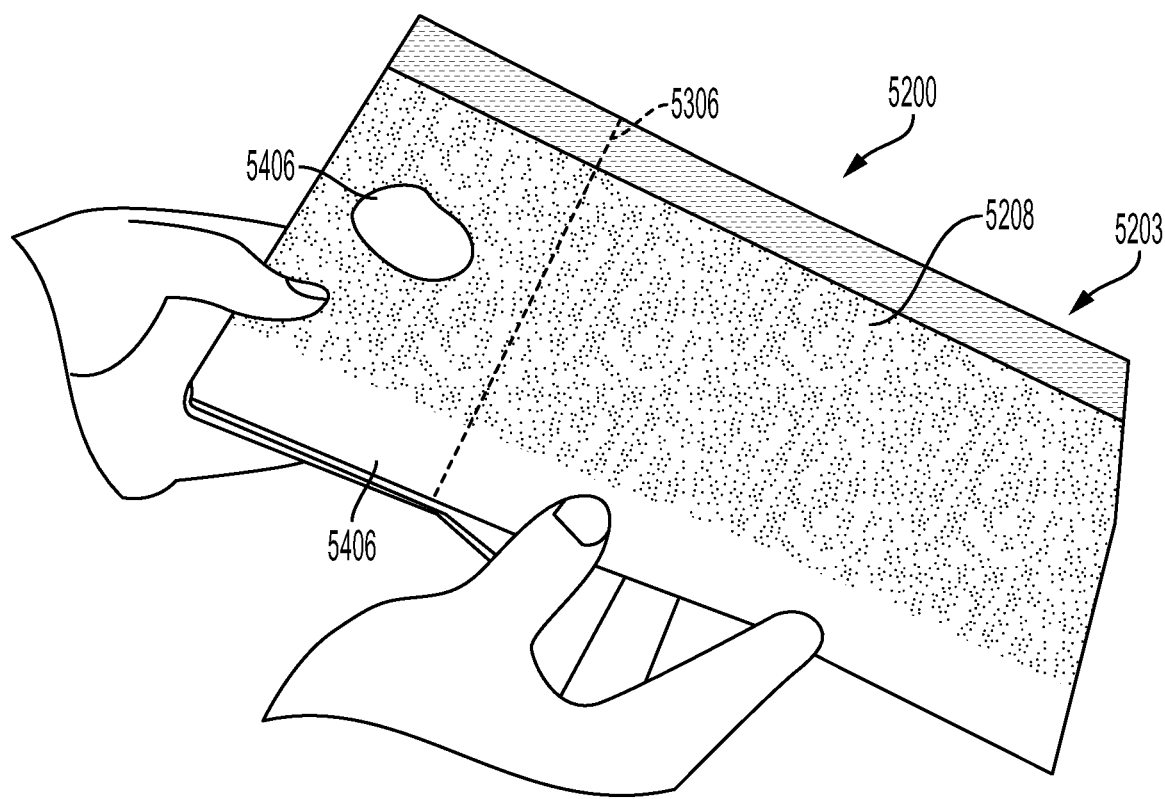
Figure 54:
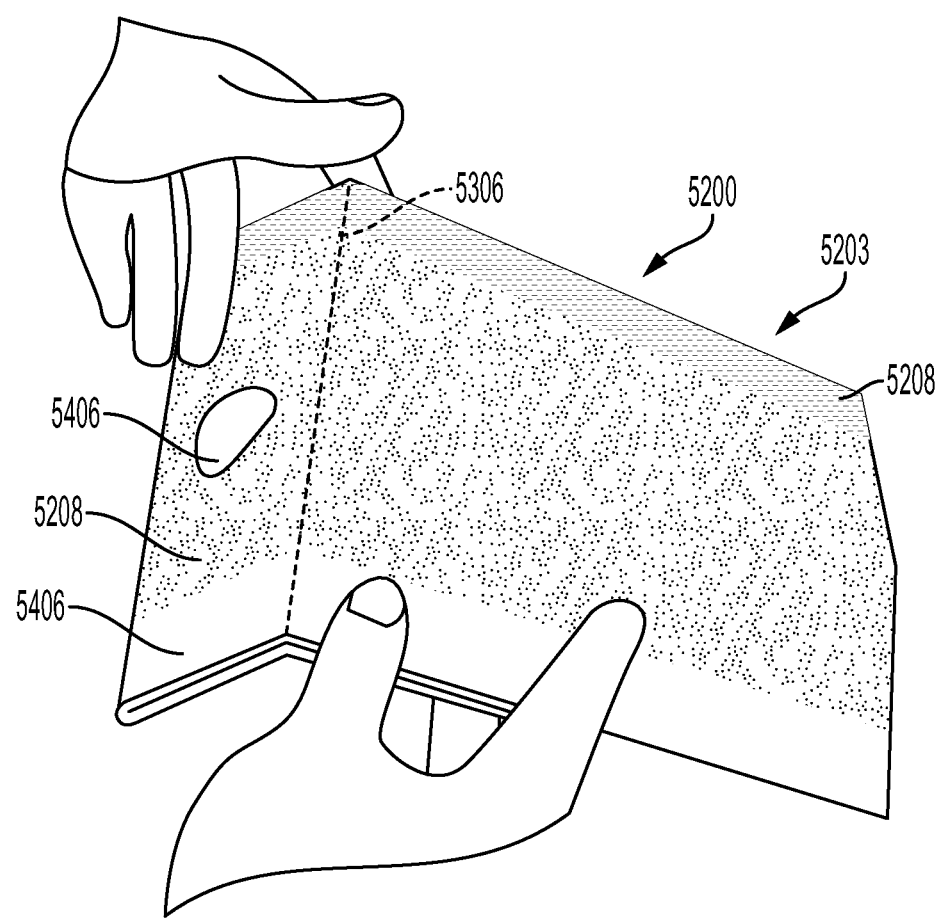
Figure 55:
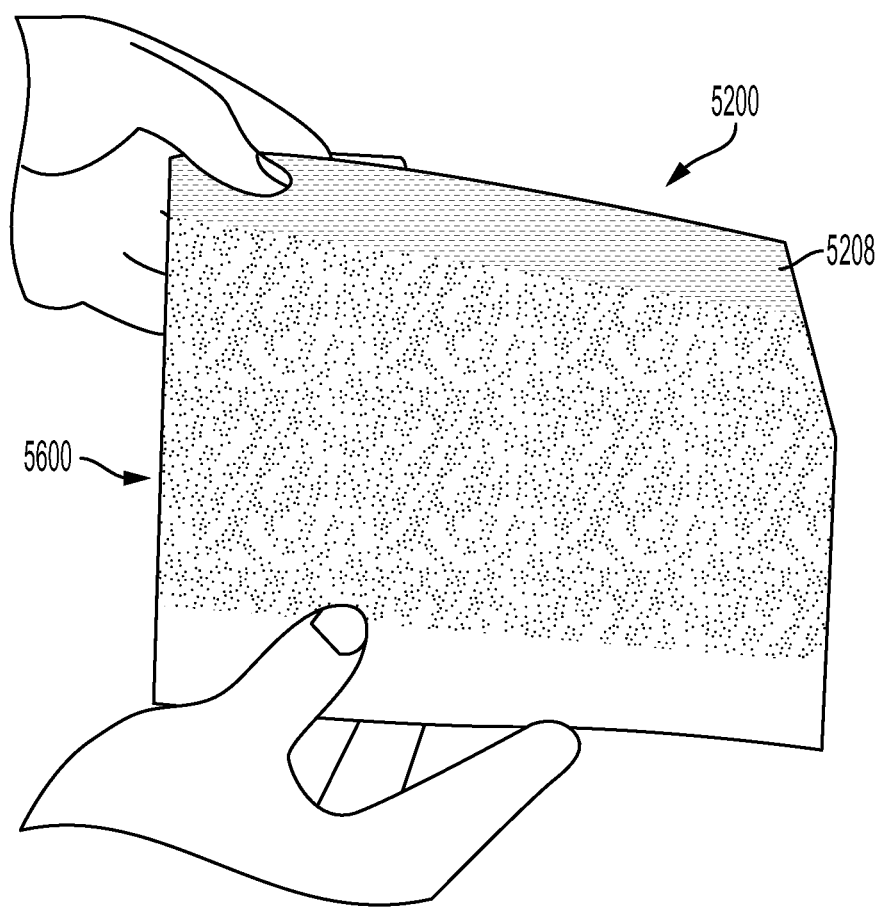
Figure 56:
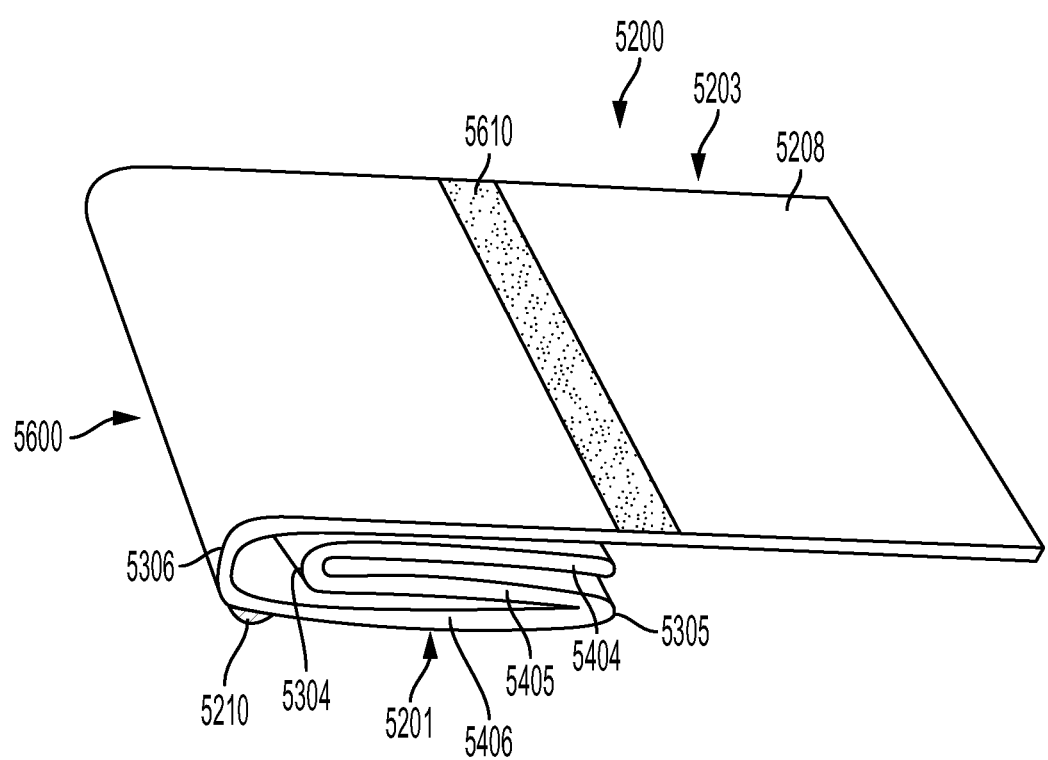

FIGS. 53-58 illustrate folding of the shingle 5200 to form a hip or ridge shingle having a thick front portion 5600 or "bull nose" (See FIG. 56). Referring to FIG. 53, the segments 5404, 5405 are folded under the segment 5406 and the unfolded portion 5203 fold line 5305. If included, a reinforcement tape along the fold line 5305 is sandwiched between the back surfaces of the segments 5405, 5406. As can be seen in FIG. 53, the cutouts 5505, 5506 become aligned or substantially aligned when the segments 5405, 5406 are folded along the fold line 5305.

Figure 57:
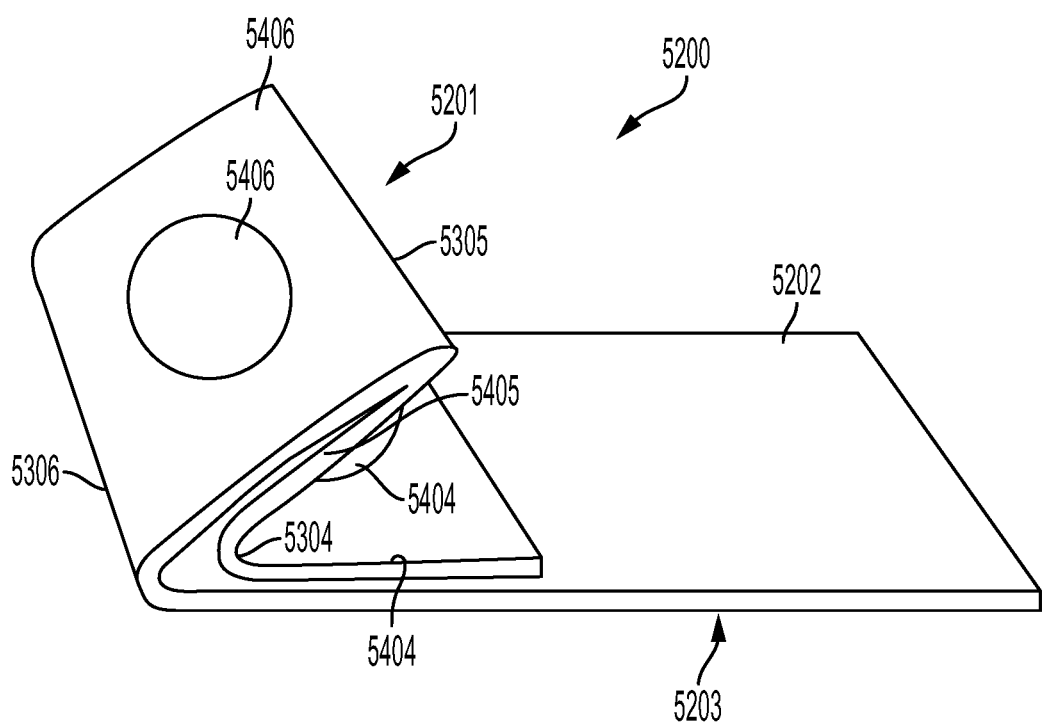

Referring to FIGS. 54-57, the segments 5405, 5406 are folded under the segment 5404 and the unfolded portion 5203 along fold line 5306. If included, a reinforcement tape along the fold line 5304 is sandwiched between the front surfaces of the segments 5404, 5405. Referring to FIG. 57, all three cutouts 5504, 5505, 5506 become aligned or substantially aligned when the segments 5405, 5406 are folded along the fold line 5306. Referring to FIG. 56, the resulting folded shingle 5200 has a front end 5600 with four layers.

Figure 58:
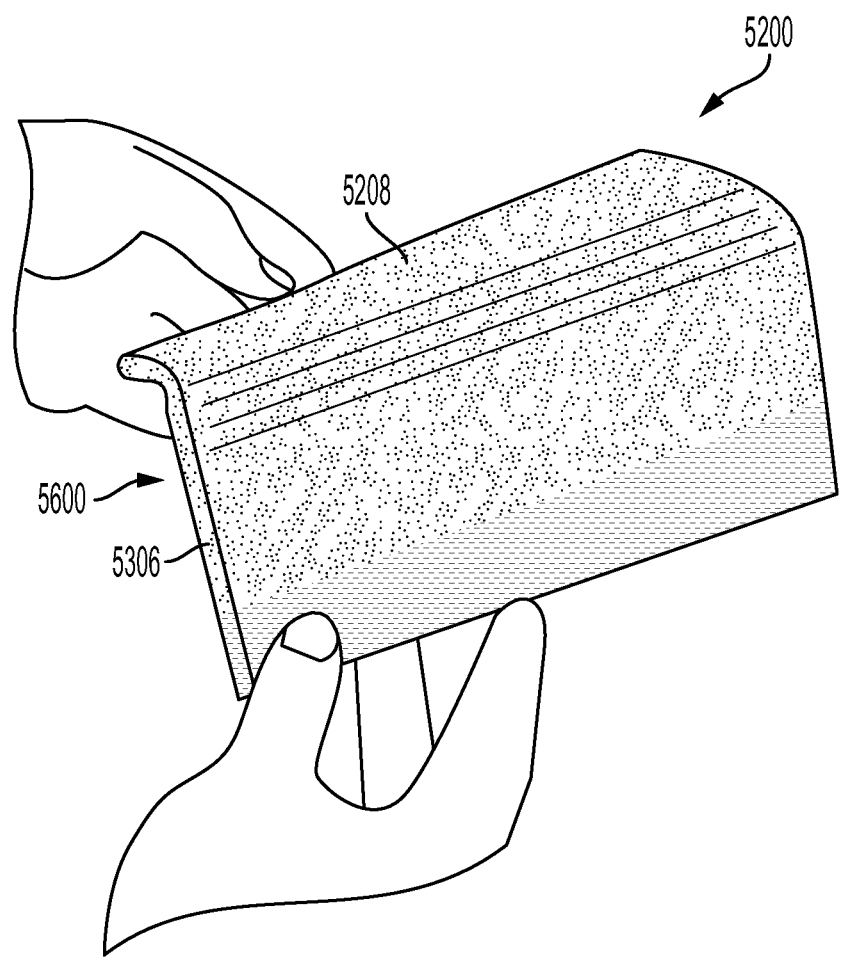

Referring to FIG. 58, the cutouts 5504, 5505, 5506 and/or the use of polymer modified asphalt to make the shingle 5200, allow the shingle to be bent to match the shape of the roof ridge or hip.

The shingle 5200 may be attached to the roof 100 (FIG. 1) by any suitable means, such as, for example, adhesive, nails, screws, staples, sealant, or other fastening devices.

The bottom of the front end 5600 (i.e. the top of segment 5406) optionally includes an adhesive portion 5210 (See FIG. 56) arranged near the front end 5600 for adhering to shingles of an adjacent lower course after the shingle 5200 is folded and installed.

The shingles 5200 can be fastened to the roof in a wide variety of different ways. Referring to FIG. 56, in one exemplary embodiment the shingles are attached to the roof with one or more fasteners through a nail zone 5610. The nail zone 5610 can include a reinforcement tape 5612. In another exemplary embodiment, the nail zone 5610 does not include a reinforcement tape and simply includes visual indicia that tells the installer where the shingle 5200 should be nailed to the roof. In the illustrated example, the nail zone 5610 is positioned rearward of the folded segments 5404, 5405, 5406, such that a fastener, such as a nail, does not pass through the folded segments 5404, 5405, 5406. In another exemplary embodiment, the nail zone 5610 overlies the folded segments 5404, 5405, 5406, such that a fastener, such as a nail, passes through all four layers.

In one exemplary embodiment the shingle is folded to the configuration illustrated by FIG. 56, bent to the shape illustrated by FIG. 58, and fastened to the roof by nails or fasteners that are driven through the nail zone 5610. This folding, bending, placement, and fastening is repeated for each overlying shingle. Each overlying shingle is placed such that the sealant or adhesive 5210 (FIG. 56) of the overlying shingle aligns with the nail zone 5610 (FIG. 56) of the underlying shingle.

In another exemplary embodiment, the shingle 5200 is installed in a manner that is the same, or similar to the installation illustrated by FIGS. 6-11. As with the roofing system illustrated by FIG. 6, the shingles 5200 can be used with an optional starter shingle 230. The starter shingle 230 may or may not include a folded portion to provide a thicker appearance to a leading edge 5600. The leading edge 5600 corresponds to the bottom portion of the shingle 5200 which is visible by a person viewing the roof 100 from ground level.

FIGS. 7A-10A are similar to the example illustrated by FIGS. 7-10, but the shingle 5200 is being installed. In this example, the second and third segments 5405, 5406 or all three segments 5404, 5405, 5406 of a first course of the folding shingle 5200 are nailed (or otherwise fastened) to the roof 100 with the main portion 5203 in an up-side down or unfolded condition. The nails 220 (or other fasteners) are applied through one or more of the folded segments 5404, 5405, 5406 on one side—the right side 112 in FIG. 7A—of the hip or ridge 104, 106. The nails 220 are optionally only applied on one side so that the shingle 200 can be folded along the fold line 5306. That is, if the shingle was nailed on both sides it would be folded convexly over the hip or ridge 104, 106, thereby making it difficult to fold the shingle along the fold line 5306 without tearing. The unfolded portion 5203 of the shingle 5200 is folded up to meet the roof, thereby creating a thicker leading edge 5212 and the exposed surface 208 faces outward, as shown in FIG. 8A. The unfolded portion 5203 is in contact with the roof and can be optionally nailed down as well, on one or both sides 110, 112 of the hip or ridge 104, 106.

Figure 7A:
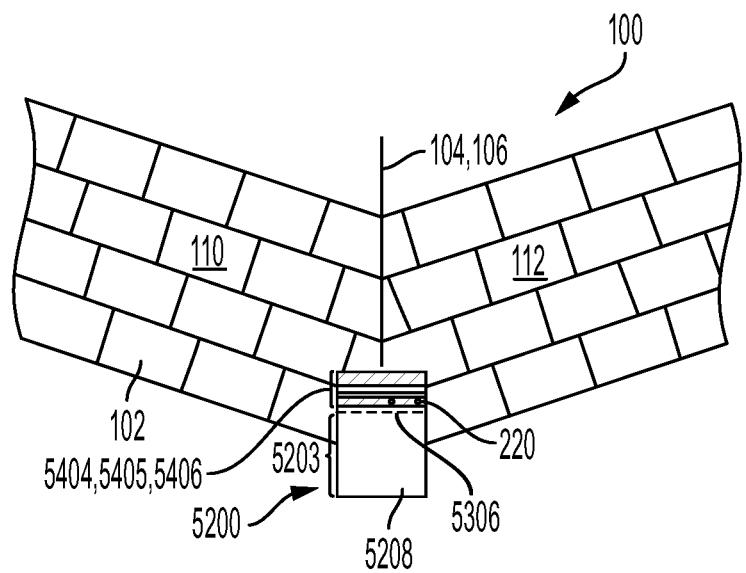
Figure 8A:
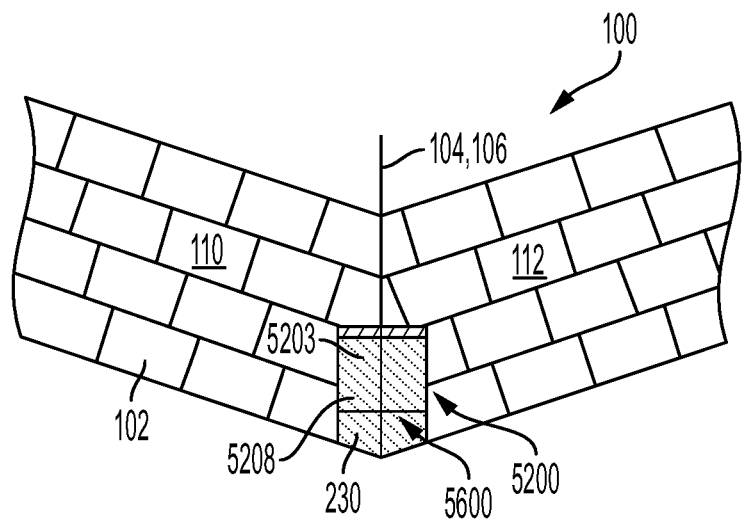
Figure 9A:
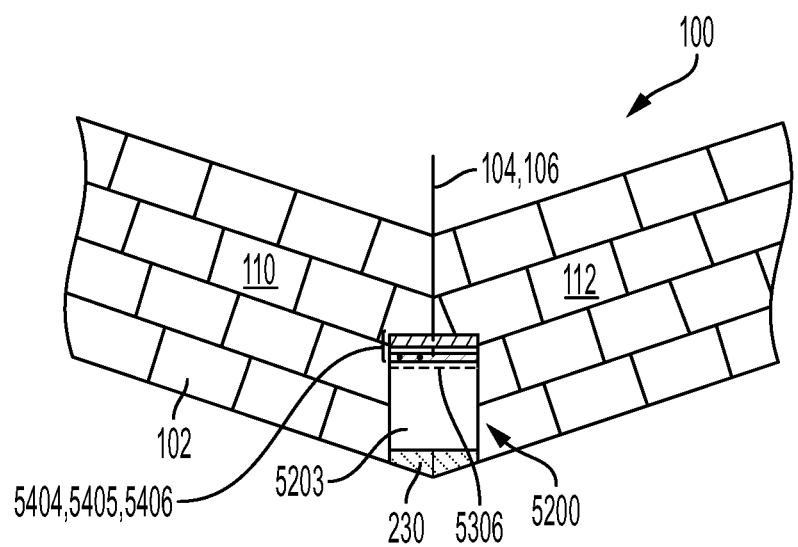
Figure 10A:
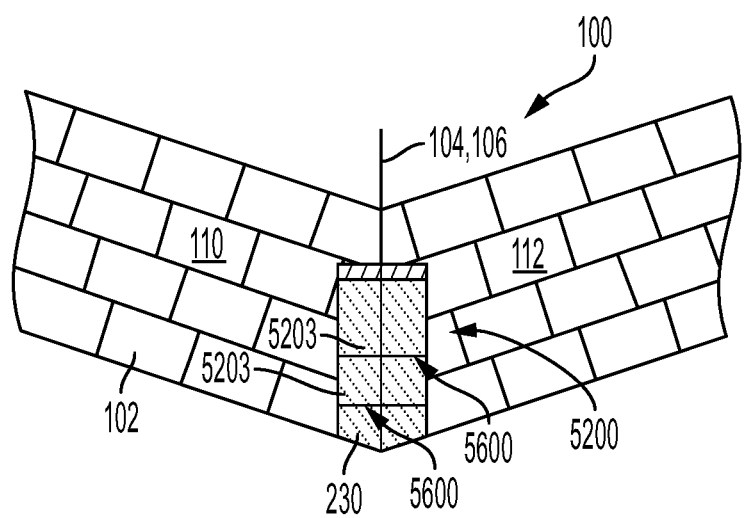

The steps shown in FIGS. 7A and 8A are repeated with the second course of folding shingles 5200, as shown in FIGS. 9A and 10A. The shingles of the second course, however, are nailed on the left side 110 of the hip or ridge 104, 106. The nails 220 in the second course penetrate the first course as well, thereby securing both sides of the first course shingle. Shingles of additional courses are then applied in a similar manner until the hip or ridge 104, 106 is covered in shingles 5200. During installation of additional courses, the nails 220 are applied to alternating sides 110, 112 of the hip or ridge 104, 106. The folded portions 5404, 5405, 5406 of the shingles 5200 are folded under the unfolded portions 5203, thus providing the thicker appearance of the leading edge 5212 than would otherwise be provided by non-folding shingles.

While various inventive aspects, concepts and features of the disclosures may be described and illustrated herein as embodied in combination in the exemplary embodiments, these various aspects, concepts and features may be used in many alternative embodiments, either individually or in various combinations and sub-combinations thereof. Unless expressly excluded herein all such combinations and sub-combinations are intended to be within the scope of the present application. Still further, while various alternative embodiments as to the various aspects, concepts and features of the disclosures—such as alternative materials, structures, configurations, methods, devices and components, alternatives as to form, fit and function, and so on—may be described herein, such descriptions are not intended to be a complete or exhaustive list of available alternative embodiments, whether presently known or later developed. Those skilled in the art may readily adopt one or more of the inventive aspects, concepts or features into additional embodiments and uses within the scope of the present application even if such embodiments are not expressly disclosed herein. Additionally, even though some features, concepts or aspects of the disclosures may be described herein as being a preferred arrangement or method, such description is not intended to suggest that such feature is required or necessary unless expressly so stated. Still further, exemplary or representative values and ranges may be included to assist in understanding the present application, however, such values and ranges are not to be construed in a limiting sense and are intended to be critical values or ranges only if so expressly stated. Moreover, while various aspects, features and concepts may be expressly identified herein as being inventive or forming part of a disclosure, such identification is not intended to be exclusive, but rather there may be inventive aspects, concepts and features that are fully described herein without being expressly identified as such or as part of a specific disclosure, the disclosures instead being set forth in the appended claims. Descriptions of exemplary methods or processes are not limited to inclusion of all steps as being required in all cases, nor is the order that the steps are presented to be construed as required or necessary unless expressly so stated. The words used in the claims have their full ordinary meanings and are not limited in any way by the description of the embodiments in the specification.

The invention claimed is:

1. A roofing material comprising:
    an overlay layer having a headlap portion and a tab portion, wherein the headlap portion comprises a bottom headlap edge and a top headlap edge, wherein the headlap portion and the tab portion are coplanar;
    an underlay layer having a height that extends from a bottom underlay edge to a top underlay edge, wherein the height of the underlay layer is less than a height of the overlay layer; and
    an intermediate layer comprising a strip of material that increases a thickness of the roofing material, wherein the intermediate layer is positioned between the underlay layer and the overlay layer such that the intermediate layer extends between the top underlay edge and the bottom headlap edge;
    wherein a height of the intermediate layer is less than both each of the height of the underlay layer and the height of the overlay layer; and
    wherein a thickness of the strip of material of the intermediate layer is equal to a thickness of at least one of the overlay layer and the underlay layer.

2. The roofing material according to claim 1, wherein the intermediate layer is attached to the overlay layer and the underlay layer by an adhesive.

3. The roofing material according to claim 2, wherein a height of the adhesive is more than half of the height the intermediate layer.

4. The roofing material according to claim 1, wherein a top edge of the intermediate layer is colinear with the top underlay edge of the underlay layer.

5. The roofing material according to claim 1, wherein a bottom edge of the intermediate layer is colinear with the bottom headlap edge of the headlap portion of the overlay layer.

6. The roofing material according to claim 1, wherein a width of the intermediate layer is equal to a width of the headlap portion of the overlay layer.

7. The roofing material according to claim 1, wherein a height extending from a bottom edge of the intermediate layer to a top edge of the intermediate layer is between 0.5 inches and 2 inches.

8. The roofing material according to claim 1, wherein the strip of material of the intermediate layer comprises a rectangular strip.

9. The roofing material according to claim 1, wherein the overlay layer comprises a reinforced nail zone, and wherein the intermediate layer extends under at least a portion of the reinforced nail zone.

10. The roofing material according to claim 1, wherein the strip of material of the intermediate layer comprises a glass fiber mat.

11. The roofing material according to claim 1, wherein the strip of material of the intermediate layer comprises an organic felt.

12. The roofing material according to claim 1, wherein the strip of material of the intermediate layer has a uniform thickness.

13. The roofing material according to claim 1, wherein the overlay layer comprises an alignment guide to assist in aligning an adjacent roofing material, and wherein a top edge of the intermediate layer is aligned with the alignment guide.

14. The roofing material according to claim 1, wherein the strip of material of the intermediate layer is separate from the overlay and underlay layers.

15. The roofing material according to claim 1, wherein the strip of material of the intermediate layer is a folded over portion of the underlay layer.

16. The roofing material according to claim 1, wherein the height of the overlay layer is more than double the height of the intermediate layer.

17. The roofing material according to claim 1, wherein the height of the underlay layer is more than double the height of the intermediate layer.

18. A roofing material comprising:
    an overlay layer having a headlap portion and a tab portion, wherein the headlap portion comprises a bottom headlap edge and a top headlap edge, wherein the headlap portion and the tab portion are coplanar;

an underlay layer having a height that extends from a bottom underlay edge to a top underlay edge, wherein the height of the underlay layer is less than a height of the overlay layer; and an intermediate layer comprising a strip of material that increases a thickness of the roofing material, wherein the intermediate layer is positioned between the underlay layer and the overlay layer, wherein an entirety of the intermediate layer extends below the headlap portion of the overlay layer, and wherein a thickness of the strip of material of the intermediate layer is equal to a thickness of at least one of the overlay layer and the underlay layer.

19. A roofing material comprising:

an overlay layer having a headlap portion and a tab portion, wherein the headlap portion comprises a bottom headlap edge and a top headlap edge, wherein the headlap portion and the tab portion are coplanar;

an underlay layer having a height that extends from a bottom underlay edge to a top underlay edge, wherein the height of the underlay layer is less than a height of the overlay layer; and an intermediate layer comprising a strip of material that increases a thickness of the roofing material, wherein the intermediate layer is positioned between the underlay layer and the overlay layer such that the intermediate layer extends between the top underlay edge and the bottom headlap edge;

wherein a height of the intermediate layer is less than both each of the height of the underlay layer and the height of the overlay layer; and wherein the intermediate layer is attached to the overlay layer and the underlay layer by an adhesive.

20. The roofing material according to claim 1, wherein the intermediate layer is parallel to the overlay layer.

21. The roofing material according to claim 1, wherein an entirety of the overlay layer is positioned above the intermediate layer.

* * * * *